United States Patent [19]
Chow

[11] Patent Number: 6,009,122
[45] Date of Patent: *Dec. 28, 1999

[54] METHOD AND APPARATUS FOR SUPERFRAME BIT ALLOCATION

[75] Inventor: Jacky S. Chow, Gilroy, Calif.

[73] Assignee: Amati Communciations Corporation, San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/855,881

[22] Filed: May 12, 1997

[51] Int. Cl.[6] .............................. H04K 1/10; H04L 27/28
[52] U.S. Cl. .......................... 375/260; 370/464; 375/295
[58] Field of Search .................................. 375/260, 295; 370/464, 310, 345, 524

[56] References Cited

U.S. PATENT DOCUMENTS

| | | | |
|---|---|---|---|
| 5,400,322 | 3/1995 | Hunt et al. | |
| 5,479,447 | 5/1993 | Chow et al. | 375/260 |
| 5,596,604 | 1/1997 | Cioffi et al. | 375/260 |
| 5,606,577 | 2/1997 | Grube et al. | 375/260 |
| 5,673,290 | 9/1997 | Cioffi | 375/260 |
| 5,680,394 | 10/1997 | Bingham et al. | 370/294 |

OTHER PUBLICATIONS

J.S.Chow et al., "Mixing Asymmetric with Symmetric Services in SDMT Systems," Standards Project T1E1.4:VDSL, T1E1.4/96–269, Sep. 4, 1996.

J.S. Chow, "Asymmetric Option for SDMT VDSL Systems," Standards Project T1E1.4:VDSL, T1E1.4/96–182, Jul. 22, 1996.

J. Cioffi, "SDMT Crosstalk Canceler (96–246)," Standards Project T1E1.4: VDSL, T1E1.4/96–246, Sep. 4, 1996.

J. Cioffi, "Add/Delete SDMT Solution for Unsynchronized VDSL Lines (96–247)," Standards Project T1E1.4:VDSL, T1E1.4/96–247, Sep. 4, 1996.

Fischer & Huber, "A New Algorithm for Discrete Multitone Transmission," IEEE, 1996.

P.S. Chow et al., "A Practical Discrete Multitone Transceiver Loading Algorithm for Data Transmission over Spectrally Shaped Channels," IEEE Transactions on Communications, vol. 43, Nos. 2/3/4, Feb., Mar., Apr. 1995.

ANSI T1.413 Standard for Telecommunications, Network and Customer Installation Interfaces—Asymmetric Digital Subscriber Line (ADSL) Metallic Interface, American National Standards Institute (ANSI), New York, 1995.

*Primary Examiner*—Chi H. Pham
*Assistant Examiner*—Bayard Emmanuel
*Attorney, Agent, or Firm*—Beyer & Weaver, LLP

[57] ABSTRACT

A method and apparatus for supporting multiple bit allocations in a multicarrier modulation system are disclosed. Hence, symbols being transmitted or received can make use of different bit allocations. By supporting the multiple bit allocations, the multicarrier modulation system is able to support bit allocation on a superframe basis. Also disclosed are techniques for selection and alignment of superframe formats to improve system performance.

25 Claims, 14 Drawing Sheets

| FRAME/TONE | # BITS |
|---|---|
| 1/1 | |
| 1/2 | |
| ⋮ | ⋮ |
| 1/256 | |
| 2/1 | |
| 2/2 | |
| ⋮ | ⋮ |
| 2/256 | |
| ⋮ | ⋮ |
| n/1 | |
| n/2 | |
| ⋮ | ⋮ |
| n/256 | |

800

METHOD AND APPARATUS FOR SUPERFRAME BIT ALLOCATION

BACKGROUND OF THE INVENTION

1. Field of the Invention

The present invention relates data communications and, more particularly, to data communications using multicarrier modulation.

2. Description of the Related Art

Bi-directional digital data transmission systems are presently being developed for high-speed data communication. One standard for high-speed data communications over twisted-pair phone lines that has developed is known as Asymmetric Digital Subscriber Lines (ADSL). Another standard for high-speed data communications over twisted-pair phone lines that is presently proposed is known as Very High Speed Digital Subscriber Lines (VDSL).

The Alliance For Telecommunications Information Solutions (ATIS), which is a group accredited by the ANSI (American National Standard Institute) Standard Group, has finalized a discrete multi tone based approach for the transmission of digital data over ADSL. The standard is intended primarily for transmitting video data and fast Internet access over ordinary telephone lines, although it may be used in a variety of other applications as well. The North American Standard is referred to as the ANSI T1.413 ADSL Standard (hereinafter ADSL standard). Transmission rates under the ADSL standard are intended to facilitate the transmission of information at rates of up to 8 million bits per second (Mbits/s) over twisted-pair phone lines. The standardized system defines the use of a discrete multi tone (DMT) system that uses 256 "tones" or "sub-channels" that are each 4.3125 kHz wide in the forward (downstream) direction. In the context of a phone system, the downstream direction is defined as transmissions from the central office (typically owned by the telephone company) to a remote location that may be an end-user (i.e., a residence or business user). In other systems, the number of tones used may be widely varied. However when modulation is performed efficiently using an inverse fast Fourier transform (IFFT), typical values for the number of available sub-channels (tones) are integer powers of two, as for example, 128, 256, 512, 1024 or 2048 sub-channels.

The ADSL standard also defines the use of a reverse signal at a data rate in the range of 16 to 800 Kbit/s. The reverse signal corresponds to transmission in an upstream direction, as for example, from the remote location to the central office. Thus, the term ADSL comes from the fact that the data transmission rate is substantially higher in the downstream direction than in the upstream direction. This is particularly useful in systems that are intended to transmit video programming or video conferencing information to a remote location over telephone lines.

Because both downstream and upstream signals travel on the same pair of wires (that is, they are duplexed) they must be separated from each other in some way. The method of duplexing used in the ADSL standard is Frequency Division Duplexing (FDD) or echo canceling. In frequency division duplexed systems, the upstream and downstream signals occupy different frequency bands and are separated at the transmitters and receivers by filters. In echo cancel systems, the upstream and downstream signals occupy the same frequency bands and are separated by signal processing.

ANSI is producing another standard for subscriber line based transmission system, which is referred to as the VDSL standard. The VDSL standard is intended to facilitate transmission rates of at least about 6 Mbit/s and up to about 52 Mbit/s or greater in the downstream direction. To achieve these rates, the transmission distance over twisted-pair phone lines must generally be shorter than the lengths permitted using ADSL. Simultaneously, the Digital, Audio and Video Council (DAVIC) is working on a similar system, which is referred to as Fiber To The Curb (FTTC). The transmission medium from the "curb" to the customer is standard unshielded twisted-pair (UTP) telephone lines.

A number of modulation schemes have been proposed for use in the VDSL and FTTC standards (hereinafter VDSL/FTTC). For example, some of the possible VDSL/FTTC modulation schemes include multi-carrier transmission schemes such as Discrete Multi-Tone modulation (DMT) or Discrete Wavelet Multi-Tone modulation (DWMT), as well as single carrier transmission schemes such as Quadrature Amplitude Modulation (QAM), Carrierless Amplitude and Phase modulation (CAP), Quadrature Phase Shift Keying (QPSK), or vestigial sideband modulation.

Most of the proposed VDSL/FTTC modulation schemes utilize frequency division duplexing of the upstream and downstream signals. One particular proposed VDSL/FTTC modulation scheme uses periodic synchronized upstream and downstream communication periods that do not overlap with one another. That is, the upstream and downstream communication periods for all of the wires that share a binder are synchronized. When the synchronized time division duplexed approach is used with DMT it is referred to as synchronized DMT (SDMT). With this arrangement, all the very high speed transmissions within the same binder are synchronized and time division duplexed such that downstream communications are not transmitted at times that overlap with the transmission of upstream communications. This is also referred to as a (i.e. "ping pong") based data transmission scheme. Quiet periods, during which no data is transmitted in either direction, separate the upstream and downstream communication periods.

A common feature of the above-mentioned transmission systems is that twisted-pair phone lines are used as at least a part of the transmission medium that connects a central office (e.g., telephone company) to users (e.g., residence or business). It is difficult to avoid twisted-pair wiring from all parts of the interconnecting transmission medium. Even though fiber optics may be available from a central office to the curb near a user's residence, twisted-pair phone lines are used to bring in the signals from the curb into the user's home or business.

The twisted-pair phone lines are grouped in a binder. While the twisted-pair phone lines are within the binder, the binder provides reasonably good protection against external electromagnetic interference. However, within the binder, the twisted-pair phone lines induce electromagnetic interference on each other. This type of electromagnetic interference is generally known as crosstalk interference which includes near-end crosstalk (NEXT) interference and far-end crosstalk (FAR) interference. As the frequency of transmission increases, the crosstalk interference becomes substantial. As a result, the data signals being transmitted over the twisted-pair phone lines at high speeds can be significantly degraded by the crosstalk interference caused by other twisted-pair phone lines in the binder. As the speed of the data transmission increases, the problem worsens.

Multicarrier modulation has been receiving a large amount of attention due to the high data transmission rates it offers. FIG. 1A is a block diagram of a conventional transmitter 100 for a multicarrier modulation system. The transmitter 100 receives data signals to be transmitted at a buffer 102. The data signals are then supplied from the buffer 102 to a forward error correction (FEC) unit 104. The FEC unit 104 compensates for errors that are due to crosstalk noise, impulse noise, channel distortion, etc. The signals output by the FEC unit 104 are supplied to a data symbol encoder 106. The data symbol encoder 106 operates to encode the signals for a plurality of frequency tones associated with the multicarrier modulation. In assigning the data, or bits of the data, to each of the frequency tones, the data symbol encoder 106 utilizes data stored in a transmit bit allocation table 108 and a transmit energy allocation table 110. The transmit bit allocation table 108 includes an integer value for each of the carriers (frequency tones) of the multicarrier modulation. The integer value indicates the number of bits that are to be allocated to the particular frequency tone. The value stored in the transmit energy allocation table 110 is used to effectively provide fractional number of bits of resolution via different allocation of energy levels to the frequency tones of the multicarrier modulation. In any case, after the data symbol encoder 106 has encoded the data onto each of the frequency tones, an Inverse Fast Fourier Transform (IFFT) unit 112 modulates the frequency domain data supplied by the data symbol encoder 106 and produces time domain signals to be transmitted. The time domain signals are then supplied to a digital-to-analog converter (DAC) 114 where the digital signals are converted to analog signals. Thereafter, the digital signals are transmitted over a channel to one or more remote receivers.

FIG. 1B is a block diagram of a remote receiver 150 for a conventional multicarrier modulation system. The remote receiver 150 receives analog signals that have been transmitted over a channel by a transmitter. The received analog signals are supplied to an analog-to-digital converter (ADC) 152. The ADC 152 converts the received analog signals to digital signals. The digital signals are then supplied to a Fast Fourier Transform (FFT) unit 154 that demodulates the digital signals while converting the digital signals from a time domain to a frequency domain. The demodulated digital signals are then supplied to a frequency domain equalizer (FEQ) unit 156. The FEQ unit 156 performs an equalization on the digital signals so the attenuation and phase are equalized over the various frequency tones. Then, a data symbol decoder 158 receives the equalized digital signals. The data symbol decoder 158 operates to decode the equalized digital signals to recover the data, or bits of data, transmitted on each of the carriers (frequency tones). In decoding the equalized digital signals, the data symbol decoder 158 needs access to the bit allocation information and the energy allocation information that were used to transmit the data. Hence, the data symbol decoder 158 is coupled to a received bit allocation table 162 and a received energy allocation table 160 which respectively store the bit allocation information and the energy allocation information that were used to transmit the data. The data obtained from each of the frequency tones is then forwarded to the forward error correction (FEC) unit 164. The FEC unit 164 performs error correction of the data to produce corrected data. The corrected data is then stored in a buffer 166. Thereafter, the data may be retrieved from the buffer 166 and further processed by the receiver 150. Alternatively, the received energy allocation table 160 could be supplied to and utilized by the FEQ unit 166.

One problem with the conventional design of transmitters and receivers of multicarrier modulation systems such as illustrated in FIGS. 1A and 1B is that only a single bit allocation is provided for transmission or reception of data symbols. In particular, the transmitter 108 has a single set of bit allocation information stored in the transmit bit allocation table 108 and the receiver 200 has a corresponding single set of bit allocation information stored in the receive bit allocation table 212. Although the bit allocation table is changeable, the processing time to update or change bit allocations is relatively slow and typically requires some sort of training process. With only a single bit allocation available to the multicarrier modulation system, the multicarrier modulation system is unable to rapidly alter its bit allocations for symbols being transmitted and received. In other words, during transmission or reception of data, the bit allocations are fixed, and thus, all symbols being transmitted and received must use the same bit allocations.

Thus, there is a need for improved transmitters and receivers of multicarrier modulation systems that are able to support multiple bit allocations so that multicarrier modulation systems are able to rapidly alter their bit allocations.

SUMMARY OF THE INVENTION

Broadly speaking, the invention is a method and apparatus for supporting multiple bit allocations in a multicarrier modulation system so that all symbols being transmitted or received can make use of different bit allocations. By supporting the multiple bit allocations, the multicarrier modulation system is able to support bit allocation on a superframe basis. The invention also pertains to selection and alignment of superframe formats to improve system performance. The invention is suitable for use in data transmission systems in which transmissions use a frame structure.

The invention can be implemented in numerous ways, including as an apparatus, system, method, or computer readable media. Several embodiments of the invention are discussed below.

As a transmitter for a data transmission system using multicarrier modulation, one embodiment of the invention includes: a superframe bit allocation table, a data symbol encoder, a multicarrier modulation unit, and a digital-to-analog converter. The superframe bit allocation table stores superframe bit allocation information including separate bit allocation information for a plurality of frames of a superframe. The data symbol encoder receives digital data to be transmitted and encodes bits associated with the digital data to frequency tones of a frame based on the superframe bit allocation information associated with the frame stored in said superframe bit allocation table. The multicarrier modulation unit modulates the encoded bits on the frequency tones of a frame to produce modulated signals. The digital-to-analog converter converts the modulated signals to analog signals.

As an apparatus for recovering data transmitted by a transmitter, an embodiment of the invention includes: an analog-to-digital converter, a demodulator, a superframe bit allocation table, and a data symbol decoder. The analog-to-digital converter receives transmitted analog signals and produces digital signals therefrom, the transmitted analog signals being time domain signals representing data transmitted. The demodulator receives the digital signals and demodulates the digital signals to produce digital frequency domain data. The superframe bit allocation table stores superframe bit allocation information including separate bit allocation information for a plurality of frames of a superframe. The data symbol decoder operates to decode bits associated with the digital frequency domain data from frequency tones of a frame based on the superframe bit allocation information associated with the frame stored in said superframe bit allocation table.

As a method for allocating bits to symbols of a superframe for transmission of data in a data transmission system using multicarrier modulation, an embodiment of the invention includes the operations of: receiving a service request for data transmission; determining a number of bits required to support the service request; obtaining performance indicia for a plurality of the symbols in a superframe; and allocating the determined number of bits to a plurality of symbols in the superframe based on the performance indicia.

As a method for determining an alignment for a superframe used to transmit data in a data transmission system using multicarrier modulation, an embodiment of the invention includes the operations of: (a) receiving a service request for data transmission; (b) selecting a superframe format based on the service request; (c) selecting a proposed alignment of the selected superframe format; (d) allocating bits to frequency tones of the selected superframe format; (e) determining a performance measure for the selected superframe format with the allocation of bits; (f) repeating operations (c)–(e) for at least one other proposed alignment; (g) choosing the one of the proposed alignments for the superframe format in accordance with the determined performance measures.

As a method for allocating bits to symbols of a superframe for transmission of data in a data transmission system using multicarrier modulation, an embodiment of the invention includes the operations of: (a) receiving a service request for data transmission; (b) selecting a superframe format based on the service request; (c) determining an alignment of the selected superframe format; (d) allocating bits to frequency tones of the selected superframe format having the alignment; (e) determining a performance measure for the selected superframe format with the allocation of bits; (f) repeating operations (b)–(e) for at least one other superframe format; (g) choosing the superframe format in accordance with the determined performance measures.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 2–12. However, those skilled in the art will readily appreciate that the detailed description given herein with respect to these figures is for explanatory purposes as the invention extends beyond these limited embodiments.

The invention is useful for high speed data transmission where crosstalk interference can be a substantial impediment to proper reception of data. In particular, the invention is useful for VDSL and ADSL data transmissions using multicarrier modulation (e.g., DMT), wherein transmission frames for all lines are synchronized but the duration of the direction of transmission can vary due to differing superframe formats.

Figure 2:
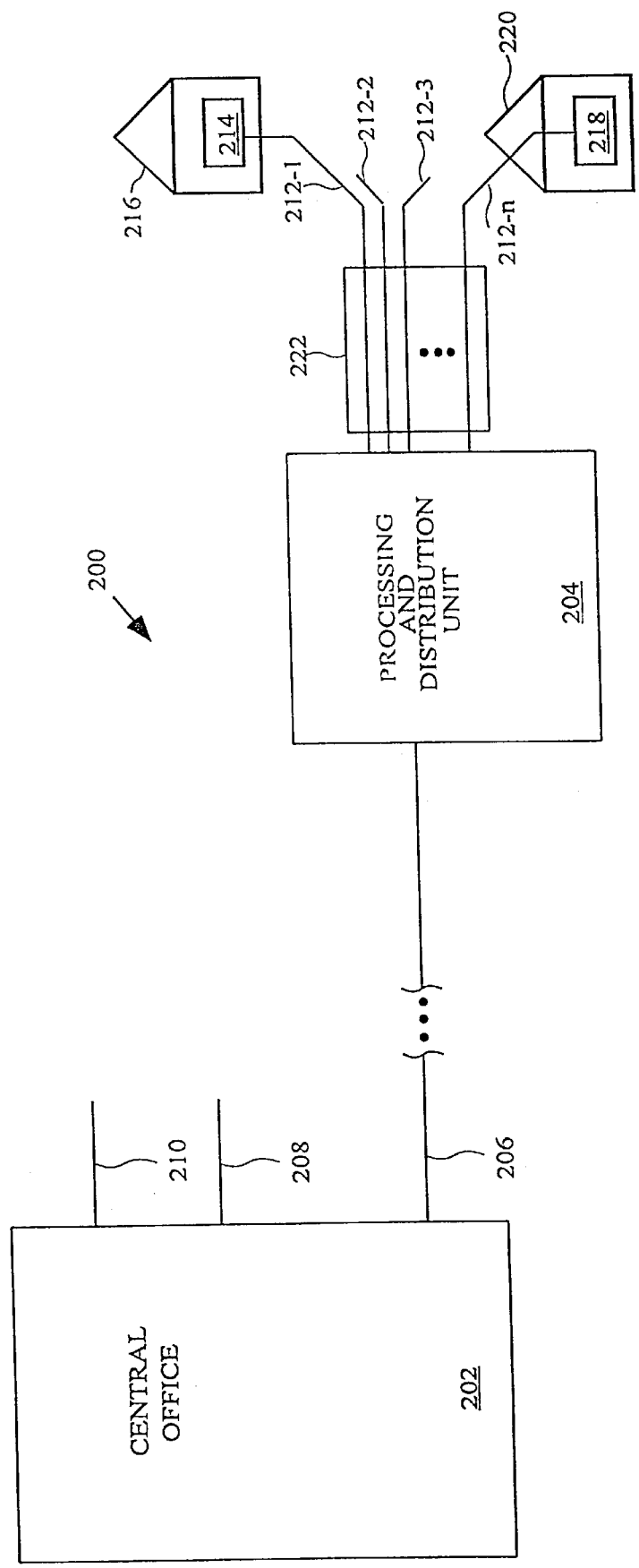
FIG. 2 is a block diagram of an exemplary telecommunications network suitable for implementing the invention.

FIG. 2 is a block diagram of an exemplary telecommunications network 200 suitable for implementing the invention. The telecommunications network 200 includes a central office 202. The central office 202 services a plurality of distribution posts to provide data transmission to and from the central office 202 to various remote units. In this exemplary embodiment, each of the distribution posts is a processing and distribution unit 204 (node). The processing and distribution unit 204 is coupled to the central office 202 by a high speed, multiplexed transmission line 206 that may take the form of a fiber optic line. Typically, when the transmission line 206 is a fiber optic line, the processing and distribution unit 204 is referred to as an optical network unit (ONU). The central office 202 also usually interacts with and couples to other processing and distribution units (not shown) through high speed, multiplexed transmission lines 208 and 210, but only the operation of the processing and distribution unit 204 is discussed below. In one embodiment, the processing and distribution unit 204 includes a modem (central modem).

The processing and distribution unit 204 services a multiplicity of discrete subscriber lines 212-1 through 212-n. Each subscriber line 212 typically services a single end user. The end user has a remote unit suitable for communicating with the processing and distribution unit 204 at very high data rates. More particularly, a remote unit 214 of a first end user 216 is coupled to the processing and distribution unit 204 by the subscriber line 212-1, and a remote unit 218 of a second end user 220 is coupled to the processing and distribution unit 204 by the subscriber line 212-n. The remote units 214 and 218 include a data communications system capable of transmitting data to and receiving data from the processing and distribution unit 204. In one embodiment, the data communication systems are modems. The remote units 214 and 218 can be incorporated within a variety of different devices, including for example, a telephone, a television, a monitor, a computer, a conferencing unit, etc. Although FIG. 2 illustrates only a single remote unit coupled to a respective subscriber line, it should be recognized that a plurality of remote units can be coupled to a single subscriber line. Moreover, although FIG. 2 illustrates the processing and distribution unit 204 as being centralized processing, it should be recognized that the processing need not be centralized and could be performed independently for each of the subscriber lines 212.

The subscriber lines 212 serviced by the processing and distribution unit 204 are bundled in a shielded binder 222 as the subscriber lines 212 leave the processing and distribution unit 204. The shielding provided by the shielded binder 222 generally serves as a good insulator against the emission (egress) and reception (ingress) of electromagnetic interference. However, the last segment of these subscriber lines, commonly referred to as a "drop" branches off from the shielded binder 222 and is coupled directly or indirectly to the end user's remote units. The "drop" portion of the subscriber line between the respective remote unit and the shielded binder 222 is normally an unshielded, twisted-pair wire. In most applications the length of the drop is not more than about 30 meters.

Crosstalk interference, including near-end crosstalk (NEXT) and far-end crosstalk (FEXT) primarily occurs in the shielded binder 222 where the subscriber lines 212 are tightly bundled. Hence, when data is transmitted on some of the subscriber lines 212 while other subscriber lines are receiving data as is common when multiple levels of service are being provided, the crosstalk inference induced becomes a substantial impairment to proper reception of data. Hence, to overcome this problem, data is transmitted using a superframe structure over which bits of data to be transmitted are allocated. The telecommunications network 200 is, for example, is particularly well suited for a SDMT transmission system offering different levels of service. One example of a SDMT transmission system is an SDMT VDSL system.

Hence, referring to the SDMT transmission system shown in FIG. 2, data transmissions over all lines 212 in the shielded binder 222 associated with the processing and distribution unit 204 are synchronized with a master clock. As such, all active lines emanating from the processing and distribution unit 204 could be transmitting in the same direction (i.e., downstream or upstream) so as to substantially eliminate NEXT interference. However, often all lines within the shielded binder 222 are not using SDMT or even when using SDMT include different levels of service. When different levels of service are used at a particular processing and distribution unit 204 (node), periods of transmission on some of the active lines will overlap with periods of reception on other active lines. Consequently, despite the use of SDMT, NEXT interference is undesirably present when different levels of service are used at a particular processing and distribution unit 204.

Figure 3:
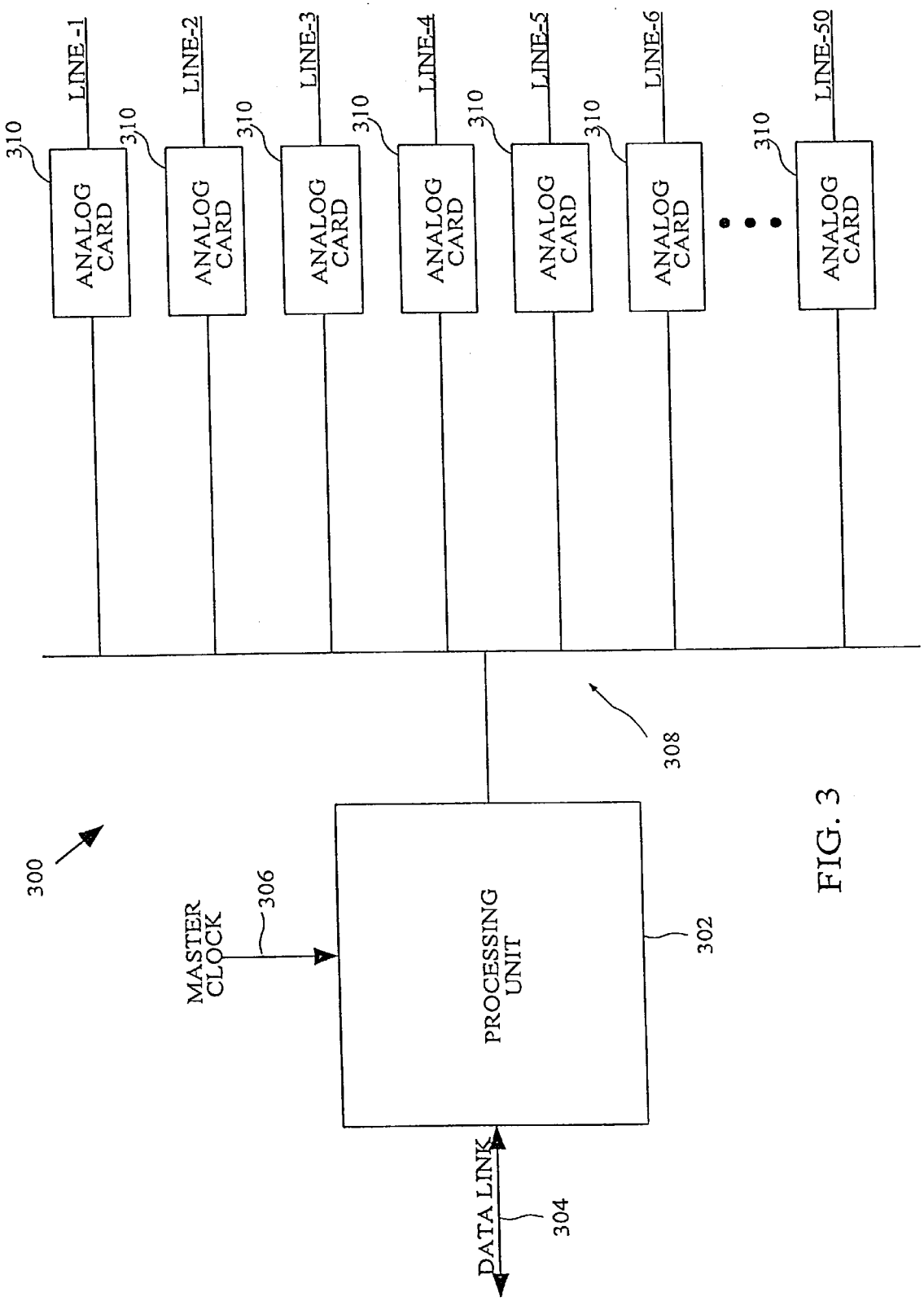
FIG. 3 is a block diagram of an exemplary processing and distribution unit according to an embodiment of the invention.

FIG. 3 is a block diagram of a processing and distribution unit 300 according to an embodiment of the invention. For example, the data processing and distribution unit 300 is a detailed implementation of the processing and distribution unit 204 illustrated in FIG. 2.

The data processing and distribution unit 300 includes a processing unit 302 that receives data and sends data over a data link 304. The data link 304 could, for example, be coupled to a fiber optic cable of a telephone network or a cable network. The processing unit 302 also receives a master clock 306 for providing synchronization to various processed transmissions and receptions of the processing unit 302. The data processing and distribution unit 300 further includes a bus arrangement 308 and a plurality of analog cards 310. The output of the processing unit 302 is coupled to the bus arrangement 308. The bus arrangement 308 together with the processing unit 302 thus direct output data from the processing unit 302 to the appropriate analog cards 310 as well as direct input from the analog cards 310 to the processing unit 302. The analog cards 310 provide analog circuitry utilized by the processing and distribution unit 300 that is typically more efficiently perform with analog components than using digital processing by the processing unit 302. For example, the analog circuitry can include filters, transformers, analog-to-digital converters or digital-to-analog converters. Each of the analog cards 310 are coupled to a different line. Typically, all the lines for a given data transmission system 300 are bundled into a binder including about fifty (50) lines (LINE-1 through LINE-50). Hence, in such an embodiment, there are fifty (50) analog cards 310 respectively coupled to the fifty (50) lines. In one embodiment, the lines are twisted-pair wires. The processing unit 302 may be a general-purpose computing device such as a digital signal processor (DSP) or a dedicated special purpose device. The bus arrangement 308 may take many arrangements and forms. The analog cards 310 need not be designed for individual lines, but could instead be a single card or circuitry that supports multiple lines.

In a case where the processing is not centralized, the processing unit 302 in FIG. 3 can be replaced by modems for each of the lines. The processing for each of the lines can then be performed independently for each of the lines. In this case, the modem may be placed on a single card along with the analog circuitry.

The NEXT interference problem occurs on the lines proximate to the output of the processing and distribution unit 300. With respect to the block diagram illustrated in FIG. 3, the NEXT interference is most prevalent near the outputs of the analog cards 310 because this is where the lines are closest to one another and have their largest power differential (between transmitted and received signals). In other words, from the output of the processing and distribution unit 300 the lines travel towards the remote units. Usually, most of the distance is within a shielded binder that would, for example, hold fifty (50) twisted-pair wires, and the remaining distance is over single unshielded twisted-pair wires. Because all these lines (e.g., twisted-pair wires) are held in close proximity in the binder and individually offer little shielding against electromagnetic coupling from other of the lines in the binder, crosstalk interference (namely NEXT interference and FEXT interference) between the lines within the binder is problematic. The invention provides useful techniques to reduce the effects of the undesired crosstalk interference.

Depending on the level of service being provided, data transmission implemented with SDMT can be symmetric or asymmetric with respect to upstream and downstream transmissions. With symmetric transmission, DMT symbols tend to be transmitted in alternating directions for equal durations. In other words, the duration in which DMT symbols are transmitted downstream is the same as the duration in which DMT symbols are transmitted upstream. With asymmetric transmission, DMT symbols tend to be transmitted downstream for a longer duration than upstream.

In VDSL it has been proposed to have a frame superframe structure a fixed number (e.g., 20) frames, with each frame being associated with a DMT symbol. With such a frame superframe, the number of frames being used for downstream transmissions and the number of frames being used for upstream transmissions can vary. As a result, there are several different superframe formats that can occur. Between the upstream and the downstream frames quiet frames are inserted to allow the channel to settle before the direction of transmission is changed.

Figure 4A:
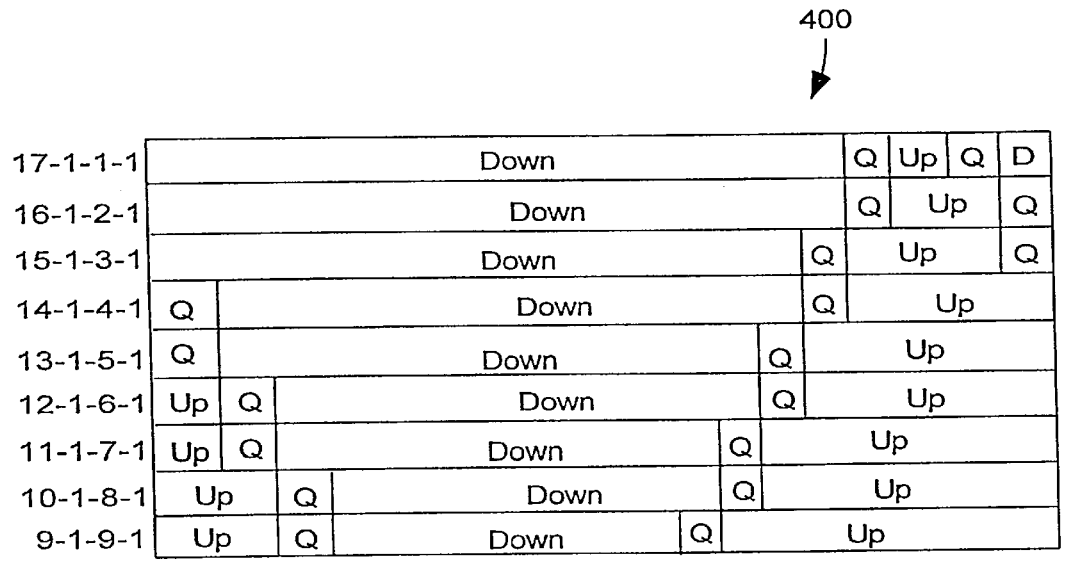
FIG. 4A is a diagram illustrating an arrangement of superframe formats according to the invention.

FIG. 4A is a diagram illustrating an arrangement 400 of superframe formats according to the invention. The arrangement 400 illustrates nine (9) different superframe formats, each of which use a twenty (20) frame superformat. Each of the superframe formats has one or more downstream frames ("D" or "Down"), one or more upstream frames ("U" or "Up"), and a quiet frame ("Q") between the transitions in direction of transmission. In FIG. 4A, each of the superframe formats is described by a descriptive set of numbers. For example, the first superframe format in the arrangement 400 is denoted "17-1-1-1" to indicate that there are 17 downstream frames, 1 quiet frame, 1 upstream frame, and 1 quiet frame. As another example, the last superframe format in the arrangement 400 is denoted "9-1-9-1" to indicate that there are 9 downstream frames, 1 quiet frame, 9 upstream frames, and 1 quiet frame, and is referred to as a symmetric format because the same amount of frames are allocated to upstream and downstream transmissions.

In synchronized DMT (SDMT) if all the lines within a binder at an optical network unit (ONU) must use the same superframe format, then the near-end crosstalk (also known as NEXT interference) is effectively diminished because all of the lines within a binder at the ONU are transmitting at the same time and likewise receiving at the same time. The disadvantage of this transmission scheme is that the mixture of service provided to each of the lines is all the same. Hence, it is very likely that some remote users will be receive too much upstream bandwidth and too little downstream bandwidth and other remote users will be receive too much downstream bandwidth and too little upstream bandwidth. Also, when the lines at a binder of the ONU are not all synchronized to the same superframe format, the NEXT interference becomes a concern.

One technique to compensate for the NEXT interference is to provide crosstalk cancellers as is described in U.S. Pat. Ser. No. 08/707,322, filed Sep. 3, 1996, by John M. Cioffi, entitled "Method and Apparatus for Crosstalk Cancellation," which is hereby incorporated by reference. The use of crosstalk cancellers in this manner operates to compensate for NEXT interference, but does not pertain to superframe format selection, alignment or bit allocation. The crosstalk cancellers also have a significant amount of complexity and tend to be most suitable when there are only a few dominant crosstalkers.

Another technique to compensate for the NEXT interference is provided by the invention. According to the invention, mixed levels of service are able to be provided by allowing lines within a binder to choose the most suitable superframe format in accordance with the level of service desired and the noise or interference present. Furthermore, according to the invention, the impact of NEXT interference (due to mixed levels of service being provided) to lines in the same binder is taken into consideration when aligning one superframe format with one or more other superframe formats and/or when allocating bits to the symbols. Hence, according to the invention, the impact of NEXT interference is significantly reduced.

In the arrangement 400 illustrated in FIG. 4A, the multiple superframe formats are aligned with one another so as to minimize or at least reduce the negative impact of interference, namely NEXT interference. In particular, the arrangement 400 provides one preferred, predetermined way to align the superframes. However, if less the nine (9) superframe formats are offered to subscribers, or if less of the formats are in use, then more options of other alignments become possible with similar benefits being obtain with respect to the minimization of the impact of NEXT interference. In general, the object is to have the synchronized frames for downstream traffic overlap one another in the various superframe formats, and then to the extent possible minimize the number of frames for upstream traffic of a given superframe format that overlap with frames for downstream traffic of any of the other superframe formats.

Figure 4B:
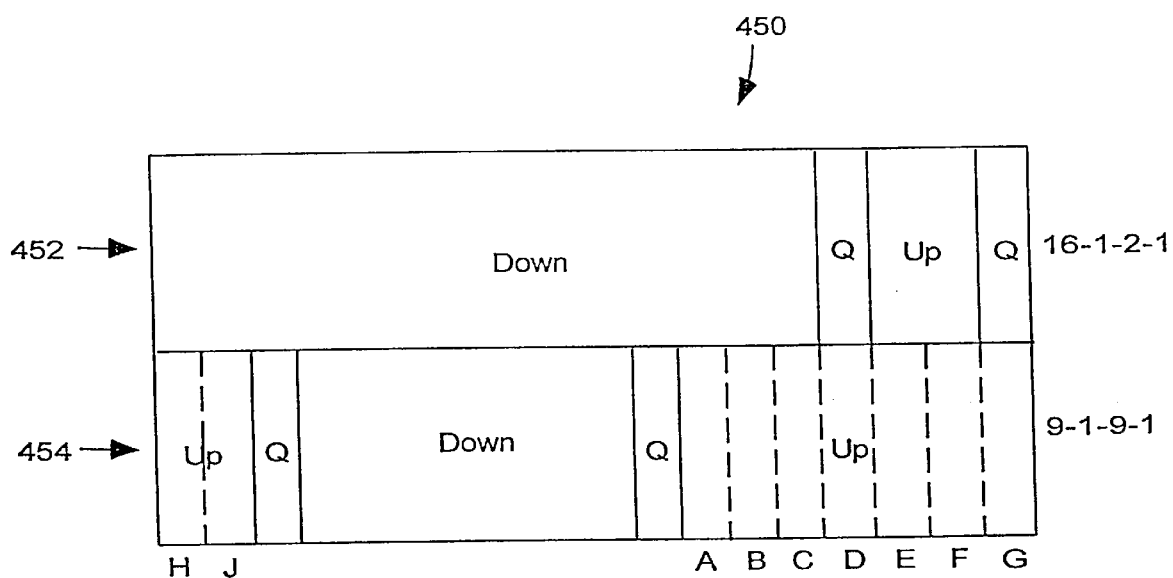
FIG. 4B illustrates a diagram of a mixed level of service provided by a multicarrier modulation system.

FIG. 4B illustrates a diagram of a mixed level of service 450 provided by a multicarrier modulation system. In this example, it is assumed that at an ONU (e.g., processing and distribution unit 204) there are two lines in service. It is also assumed that a first line in service is using a first superframe format 452, and a second line in service is using a second superframe format 454. The first superframe format 452 corresponds to the "16-1-2-1" superframe format in FIG. 4A, and the second superframe format 454 corresponds to the "9-1-9-1" superframe format in FIG. 4A.

In FIG. 4B, the first and second superframe formats 452 and 454 are illustrated as being aligned in a particular way so as to minimize NEXT interference between the two lines providing different levels of service. For transmissions going in the same direction between the two lines, far-end crosstalk (FEXT interference) is present. For transmissions going in the opposite direction between the two lines, NEXT interference is present. Usually, the NEXT interference is substantially more severe than the FEXT interference, and thus it is advantageous to minimize the NEXT interference even if additional FEXT interference results. Also note that the NEXT interference is much worse at the ONU side than the remote receiver side where receivers tend to be physically different positions.

For example, in the alignment of the first and second superframe formats 452 and 454 in FIG. 4B, the frames A, B, C, H and J of the second superframe format 454 which carry upstream transmissions are negatively impacted by NEXT interference from the downstream transmissions according to the first superframe format 452 by the ONU. Hence, with the alignment of the first and second superframe formats 452 and 454 illustrated in FIG. 4B, only five (5) of the nine total frames transmitting in the upstream direction suffer from NEXT interference. On the other hand, the worse case alignment of the first and second superframe formats 452 and 454 would be that all nine (9) of the upstream frames of the second superframe format 454 would be susceptible to NEXT interference from the downstream transmissions of the first superframe format 452. Also, if the channel response is reasonably short, then upstream frames D and G would have no NEXT interference and no FEXT interference. The upstream frames E and F of the second superframe format 454 would have FEXT interference from the first superframe format 452.

Figure 1A:
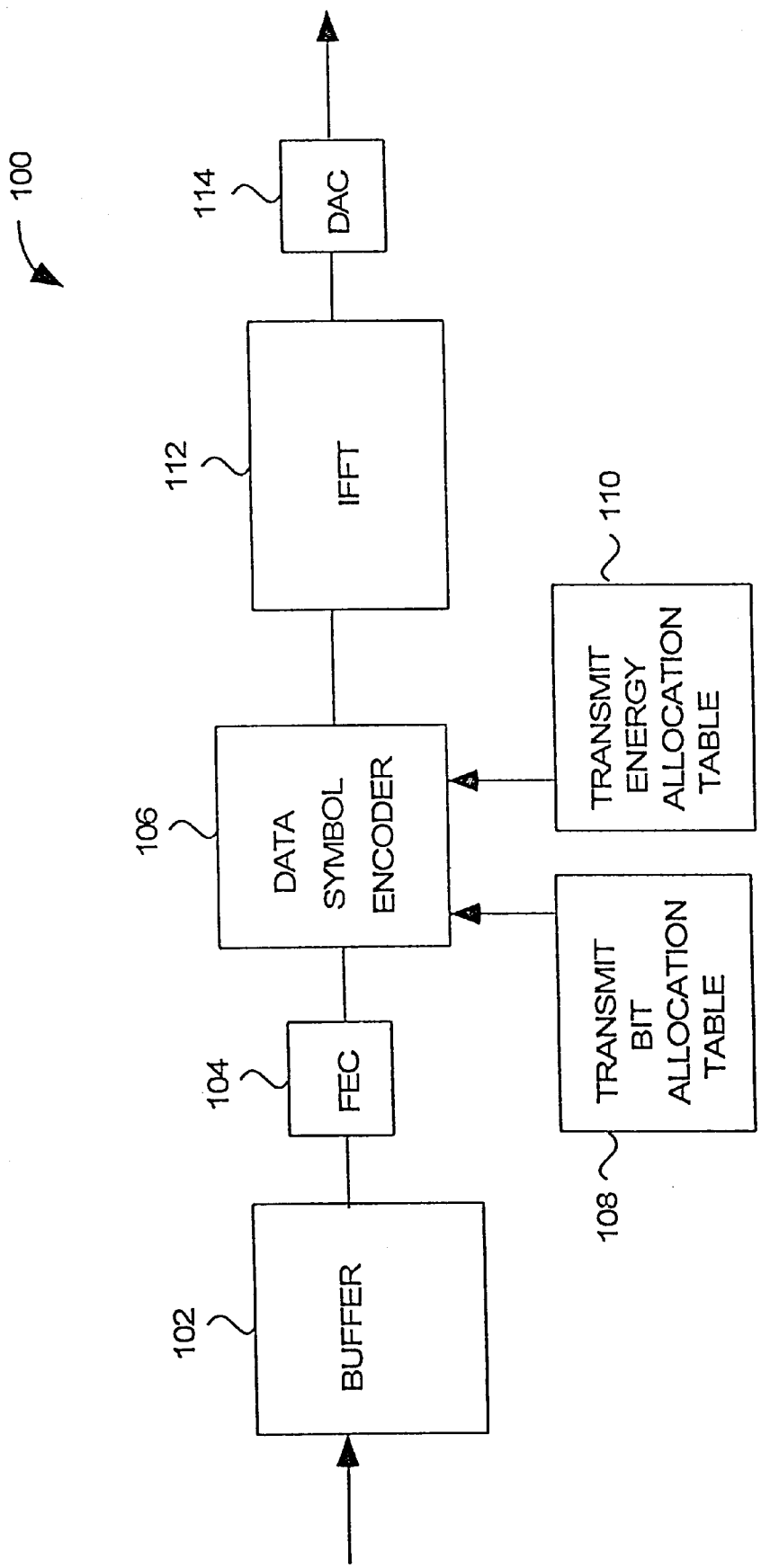
FIG. 1A is a block diagram of a conventional transmitter for a multicarrier modulation system.
Figure 1B:
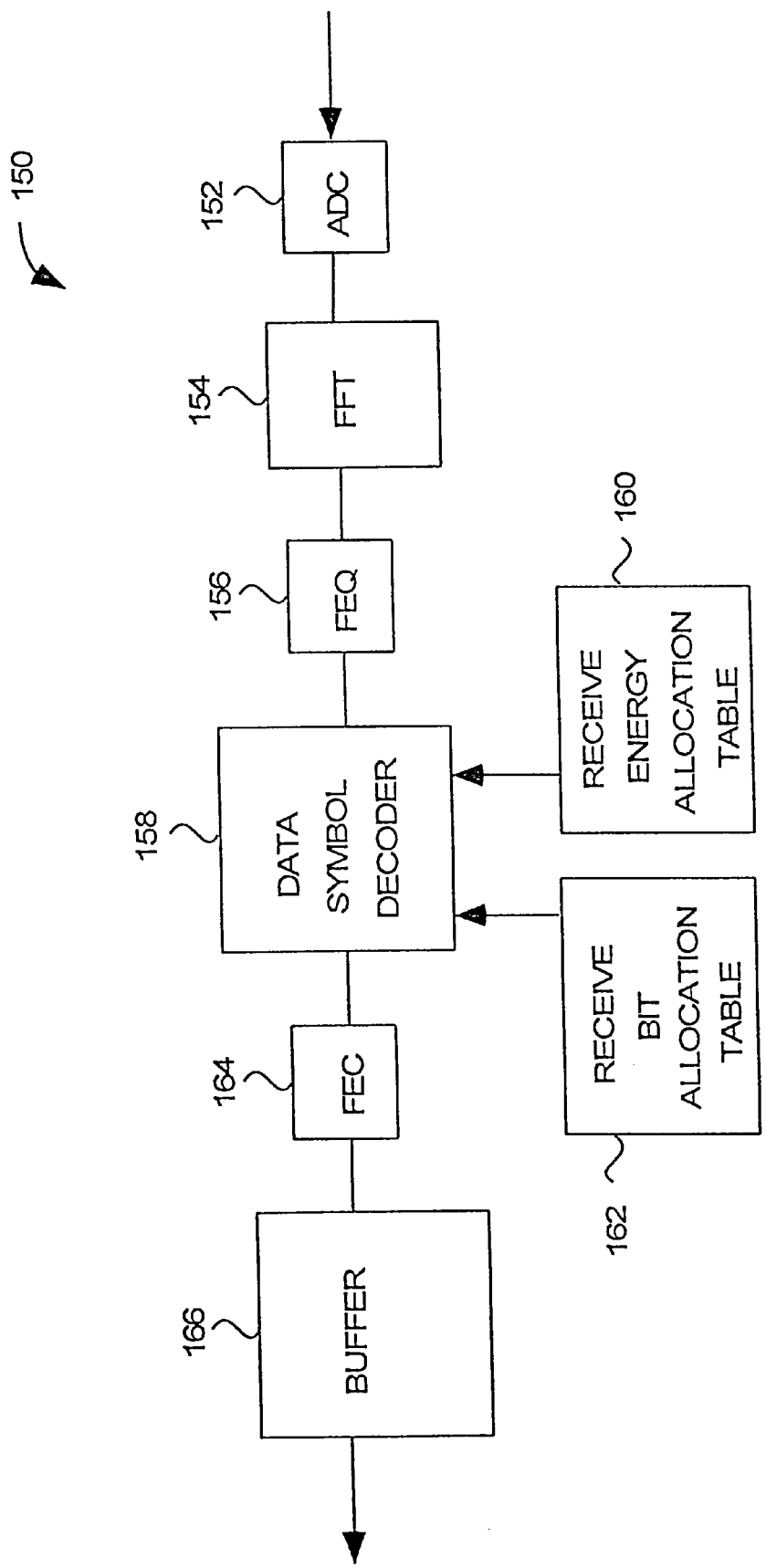
FIG. 1B is a block diagram of a remote receiver for a conventional multicarrier modulation system.

Given that whenever a mixture of levels of service are provided, different frames within the superframe format assigned to a line will be subjected to substantially different interference from corresponding frame of other lines in the binder at the ONU side. Accordingly, for each of the lines, the interference across the superframe format may be significantly different at different frames. More particularly, different frequency tones of the frames may be subjected to different levels of interference across the superframe format. As a result, the conventional approach illustrated in FIGS. 1A and 1B of having only a single bit allocation table for transmissions in a given direction is a significant limitation to the performance of the multicarrier modulation system and its ability to support superframes. For example, with respect to the upstream transmissions on the line utilizing the second superframe format 454 illustrated in FIG. 4B, several different bit allocations (for the superframe) would be useful to optimizing the upstream transmission performance. For example, it would be advantageous to be able to carry less information (e.g., bits of data) on the nine (9) frames carrying upstream transmissions (namely, frames A, B, C, H, and J) that suffer from large amounts of NEXT interference, and to carry more information on those frames that suffer from little or no NEXT interference. Further, it would also be an advantage to carry more data on those frames that suffer from little or no NEXT or FEXT interference, and less data on the frames that suffer from FEXT interference but little or no NEXT interference.

Figure 5:
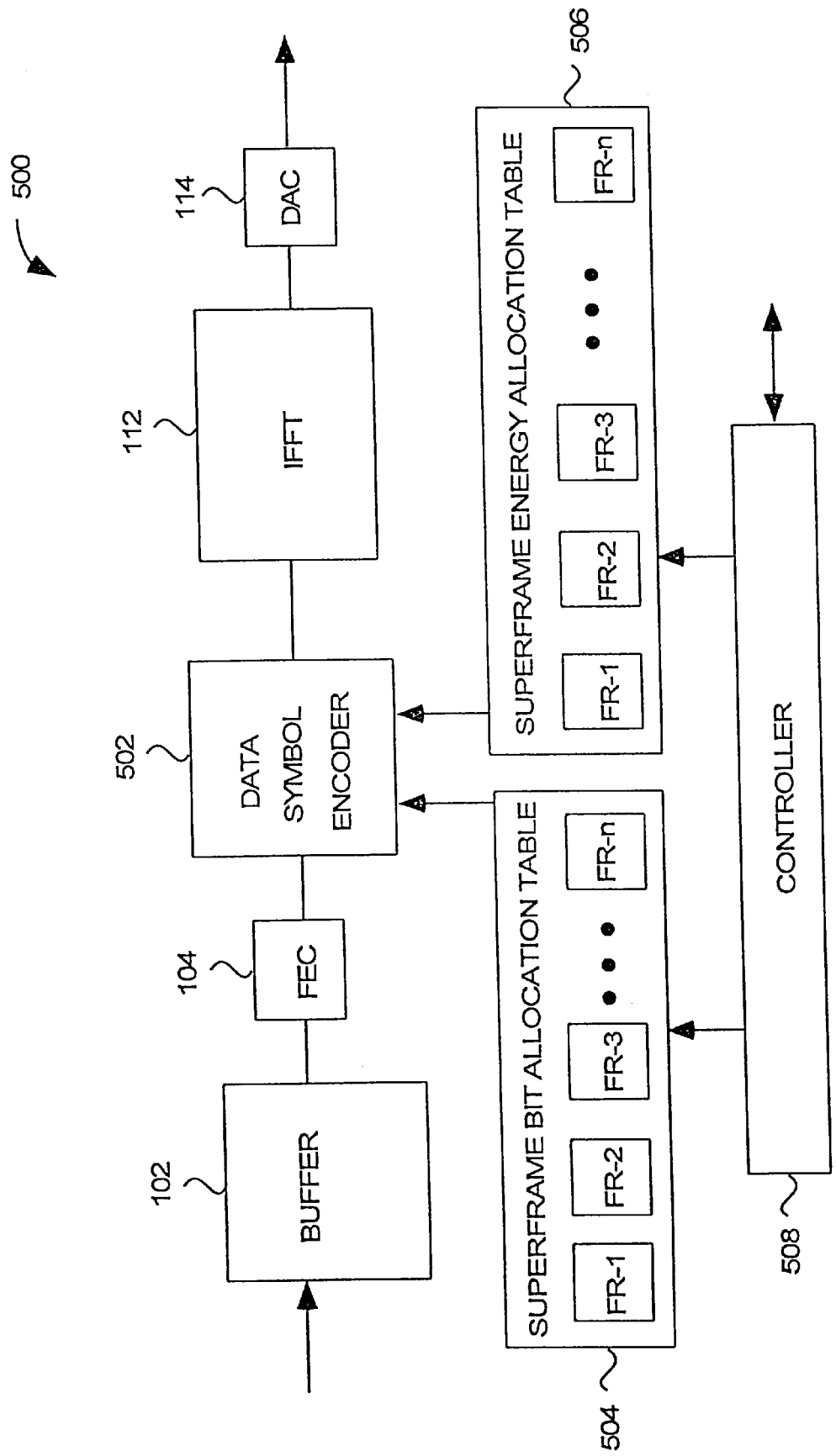
FIG. 5 is a block diagram of a transmitter for a multicarrier modulation system according to an embodiment of the invention.

FIG. 5 is a block diagram of a transmitter 500 for a multicarrier modulation system according to an embodiment of the invention. The transmitter 500 is able to support multiple different bit allocations within a superframe as well as different superframe formats.

The transmitter 500 receives at the buffer 102 data signals to be transmitted. The data signals are then supplied to the FEC unit 104. The FEC unit 104 performs error correction on the data signals, and then supplies the data signals to a data symbol encoder 502. The data symbol encoder 502 encodes the data signals onto a plurality of frequency tones associated with a symbol (frame). In allocating the bits to the particular frequency tones of the symbol, the data symbol encoder 502 obtains bit and energy allocation information from a superframe bit allocation table 504 and a superframe energy allocation table 506, respectively.

The transmitter 500 is capable of supporting a multitude of superframe formats, and as such, the data symbol encoder 502 must be able to retrieve a variety of different bit allocations for the various frames of the superframe. In other words, the superframe bit allocation table 504 includes, in effect, a bit allocation table for each downstream transmission frame in the superframe format. For example, with respect to the example illustrated in FIG. 4A, the maximum number of frames in the downstream direction is seventeen (17); hence, the superframe bit allocation table 504 would include seventeen different individual bit allocation tables. As illustrated in FIG. 5, these bit allocation tables for each of the frames transmitting in the downstream direction are identified as FR-1, FR-2, FR-3, . . . , FR-n in the superframe bit allocation table 504. Likewise, the superframe energy allocation table 506 may include individual energy allocation tables for each of the frames transmitting in the downstream transmission direction are identified in FIG. 5 as FR-1, FR-2, FR-3, . . . , FR-n. As a result, each frame for downstream transmissions in the superframe can optimize its bit allocations over the superframe.

After the symbols have been created, they are supplied to the IFFT unit 112 for modulation and conversion to the time domain. Typically, although not shown, a cyclic prefix is added to the time domain signals. The resulting time domain signals are converted to analog signals by the DAC unit 114. The transmitter 500 also includes a controller 508 that operates to control, among other things, the proper selection of the effectively individualized allocation tables from the superframe bit allocation table 504 and the proper selection of the effectively individualized energy allocation tables from the superframe energy allocation table 506. In this way, the data symbol encoder 502 utilizes better bit allocations for the particular frames of a superframe format. The controller 508 may also control the transmitter 500 to transmit data in accordance with a superframe format.

Although the superframe bit allocation table 504 may be arranged so as to provide individual bit allocation tables for each frame of the superframe, the superframe bit allocation 504 can be one large table having different portions containing bit allocation information for different frames of the superframe. Further, the superframe bit allocation table 504 need not have separate bit allocation information, or bit allocation tables, for each of the frames of the superframe; instead, the superframe bit allocation 504 could include bit allocation information, or bit allocation tables, for a group of frames. The superframe energy allocation table 506 is optionally provided in the transmitter 500 to allow for fractional bits to be encoded on a symbol by the data symbol encoder 502, but if provided, typically has an arrangement similar to that of the superframe bit allocation table 504.

Figure 6:
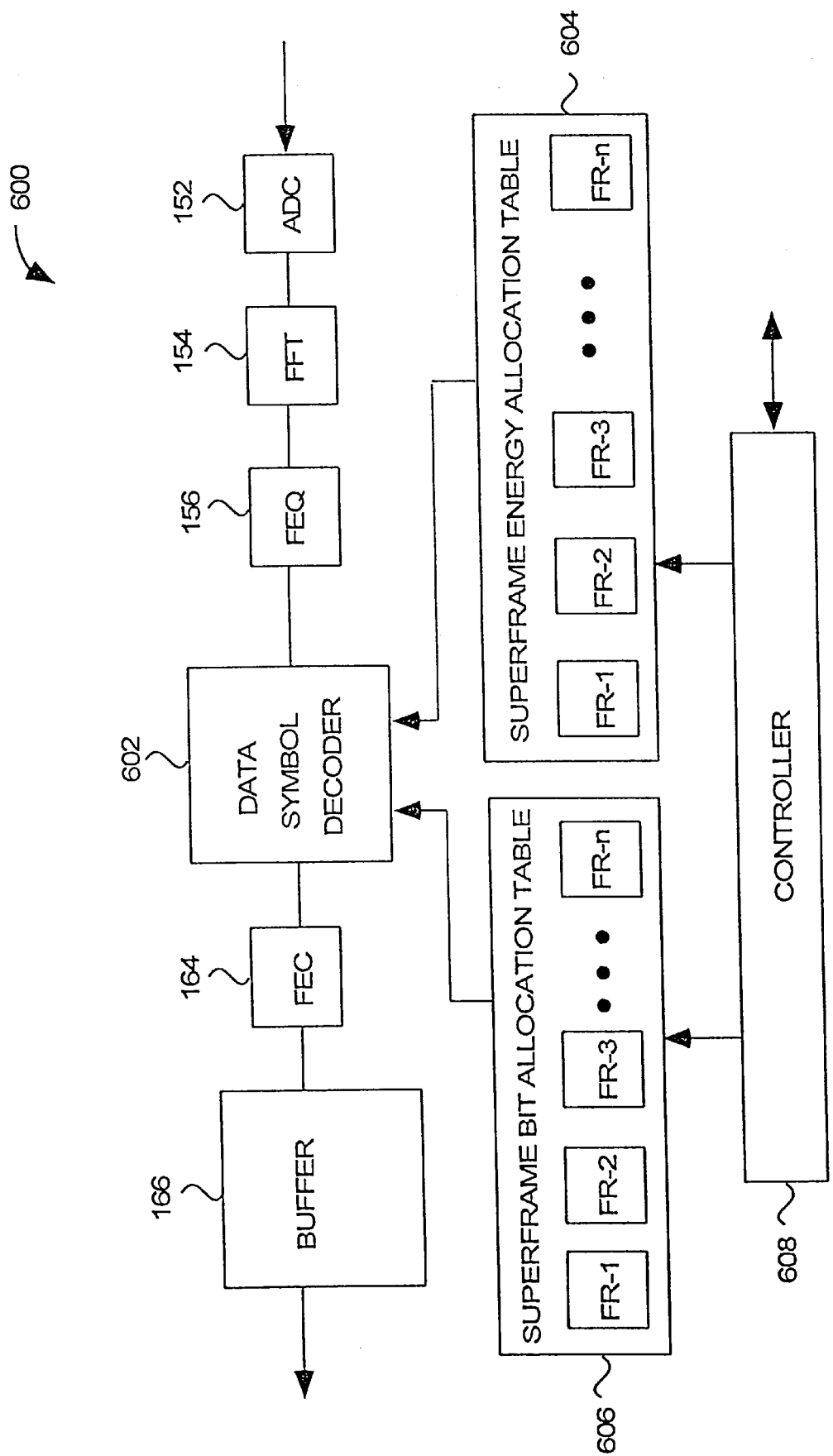
FIG. 6 is a block diagram of a remote receiver for a multicarrier modulation system according to an embodiment of the invention.

FIG. 6 is a block diagram of a remote receiver 600 for a multicarrier modulation system according to an embodiment of the invention. Like the transmitter 500, the remote receiver 600 is able to support (i) multiple different bit allocations within a superframe and (ii) different superframe formats.

The remote receiver 600 receives analog signals from a channel and supplies them to the ADC unit 152. Typically, although not shown, the cyclic prefix (if transmitted) would be removed and time domain equalization of the digital signals from the ADC unit 152 would be performed. The resulting digital dignals are then supplied to the FFT unit 154. The FFT unit 154 produces frequency domain data by demodulating the incoming data signals and converting the signals from the time domain to the frequency domain. The frequency domain data is then equalized by the FEQ unit 156. The equalized frequency domain data is then supplied to a data symbol decoder 602. The data symbol decoder 602 operates to receive the equalized frequency domain data and decode the data from each of the frequency tones associated with the frame being received. In decoding the symbols, the data symbol decoder 602 utilizes energy allocation information from a superframe energy allocation table 604 and bit allocation information from a superframe bit allocation table 606. The energy and bit allocation information stored in the superframe tables 604 and 606 is such that a variety of effectively different bit and energy allocation tables can be used to decode frames in a superframe. The decoding is, however, dependent on the particular allocation used to encode respective frames in the superframe at the transmitter. Alternatively, the superframe energy allocation table 604 can be supplied to and utilized by the FEQ unit 156. In any case, the decoded data is then supplied to the FEC unit 164 which provides forward error correction. The decoded data is then stored in the buffer 166 for subsequent use by the receiver 600. The receiver 600 also includes a controller 608 that operates to control the selection of the appropriate bit allocation information and the appropriate energy allocation information for use with respect to particular frames within the superframe format. The controller 608 may also control the receiver 600 to receive incoming analog signals in accordance with the particular superframe format that was used by the associated transmitter.

Figure 7:
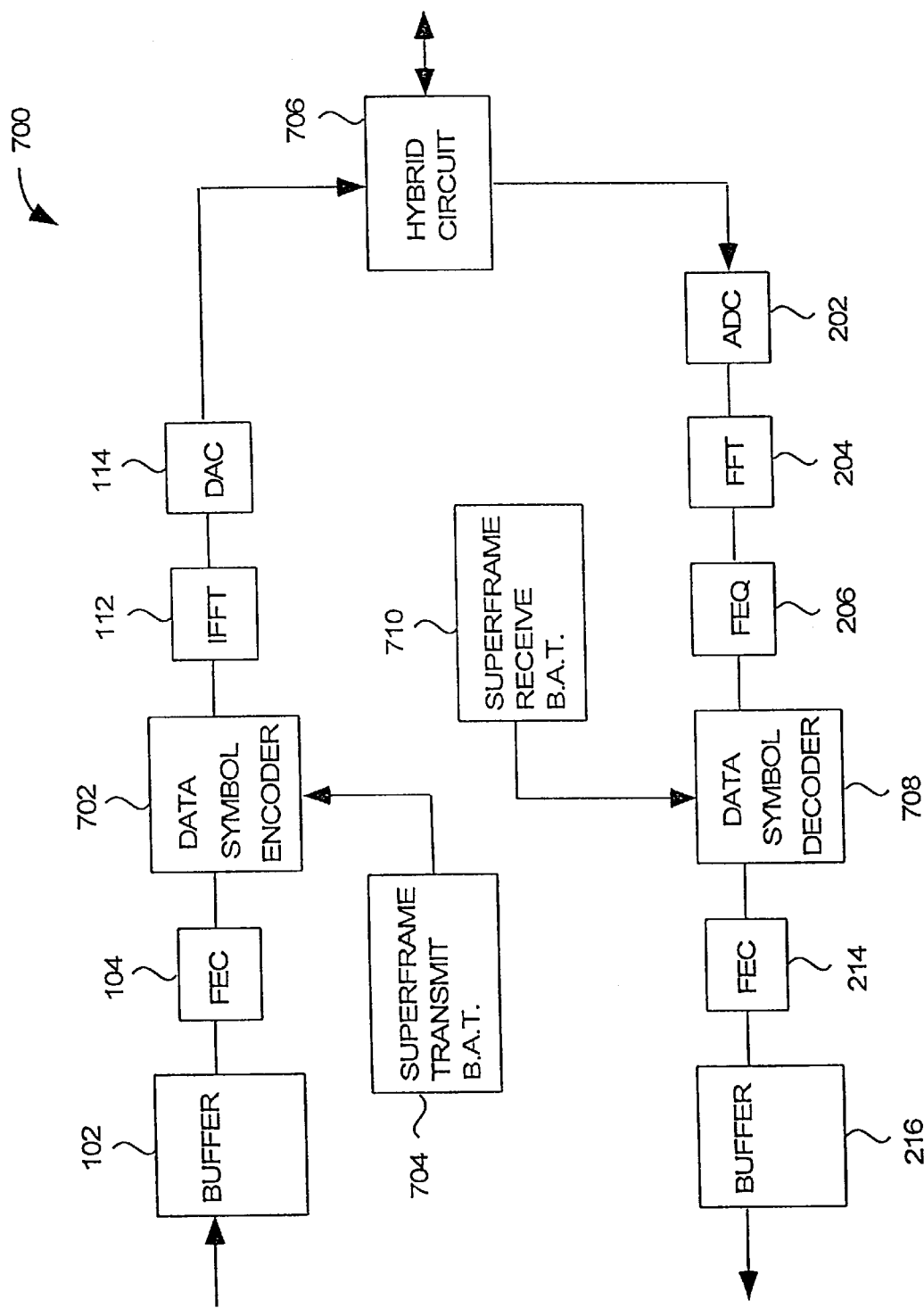
FIG. 7 is a block diagram of a transceiver according to an embodiment of the invention.

FIG. 7 is a block diagram of a transceiver 700 according to an embodiment of the invention. The transceiver 700 has both a transmitter side and a receiver side and is suitable for bi-directional data transmission. The transmitter side transmits data by supplying it to the buffer 102. The data is then obtained from the buffer 102 and supplied to the FEC unit 104. A data symbol encoder 702 then operates to encode the data on to frequency tones of a symbol based on bit allocation information obtained from a superframe transmit bit allocation table 704. The encoded data is then supplied to the IFFT unit 112 which modulates the data and converts the modulated data into time domain data. The time domain data is then converted to analog signals by the DAC 114. The analog signals are then supplied to a hybrid circuit 706 and transmitted over a channel.

The receiver side of the transceiver 700 receives analog signals that have been transmitted over a channel via the hybrid circuit 706. The received analog signals are then supplied to the ADC 202 which converts the received digital signals to digital signals. The digital signals are then supplied to the FFT unit 204 which produces frequency domain signals. The frequency domain signals are then equalized by the FEQ unit 206. The equalized signals are then supplied to a data symbol decoder 708. The data symbol decoder 708 operates to decode the equalized signals to recover data that has been transmitted on each of the frequency tones of the symbol being received. The decoding by the data symbol decoder 708 is performed based on bit allocation information stored in a superframe receive bit allocation table 710. The decoded data is then supplied to the FEC unit 214 and then stored in the buffer 216.

Generally speaking, the bit allocation information stored in the superframe transmit bit allocation table 704 and the bit allocation information stored in the superframe receive bit allocation table 710 are not the same due to different noise impairments. The superframe transmit bit allocation table 704 would, for example, contain bit allocation information that is to be utilized in coding data to be transmitted in the various downstream frames of a superframe format. On the other hand, the received bit allocation information stored in the superframe receive bit allocation table 710 would, for example, contain bit allocation information to be utilized in decoding the frames of the superframe format that are received from a remote receiver transmitting in the upstream direction.

Figure 8:
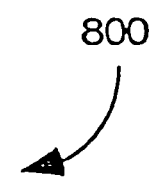
FIG. 8 is a diagram of a superframe bit allocation table according to one embodiment of the invention.

FIG. 8 is a diagram of a superframe bit allocation table 800 according to one embodiment of the invention. The superframe bit allocation table 800 in this embodiment is a single table including bit allocation information for each of the frequency tones of each of the frames for a given direction. For example, if the superframe bit allocation table 800 is for a transmitter, then the bit allocation would be provided for those of the frames that could possibly transmit in the downstream direction. In the case of a data transmission system offering the superframe formats shown in FIG. 4A, the superframe bit allocation table 800 could contain bit allocation information for up to seventeen (17) frames. However, it should be recognized that the size of the superframe bit allocation table could also be made smaller by requiring various of the frames which experience similar channel conditions to share or utilize the same bit allocation information.

The above-described exemplary apparatuses for the invention permit a number of new processing operations that are able to enhance the operation of data transmission systems such as multicarrier modulation systems. These new processing operations form other aspects of the invention and are explained in detail below.

Figure 9:
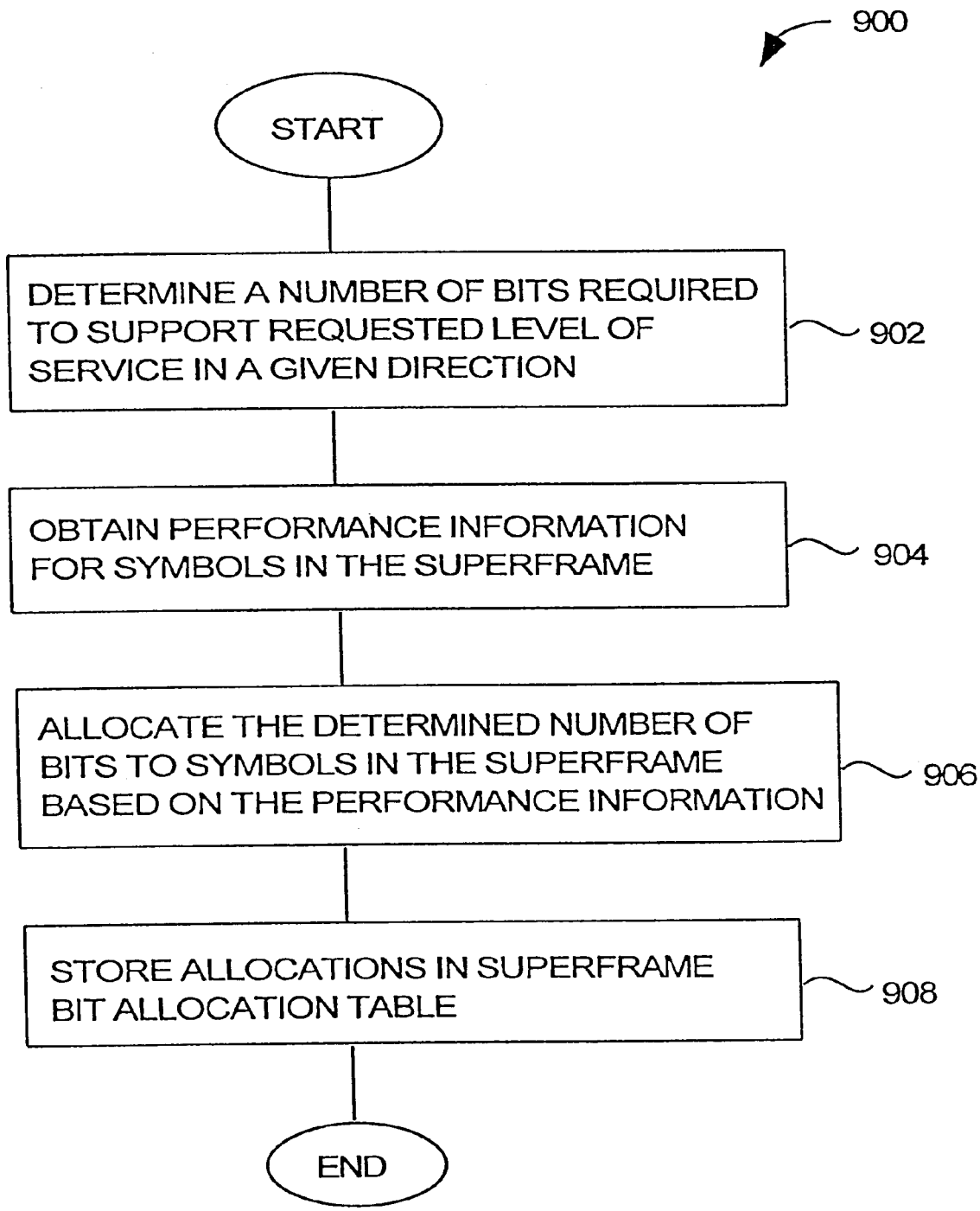
FIG. 9 is a flow diagram of superframe bit allocation process according to one embodiment of the invention.

FIG. 9 is a flow diagram of superframe bit allocation process 900 according to one embodiment of the invention. Initially, the number of bits required to support a requested level of service in a given direction is determined 902. Then, performance information for symbols in the superframe is obtained 904. As an example, the performance information may be signal-to-noise ratio (SNR) information. Next, the determined number of bits required to support the requested level of service are allocated 906 to symbols in the superframe based on the performance information. The resulting allocations are then stored 908. Following block 908, the superframe bit allocation processing 900 is complete and ends.

Figure 10A:
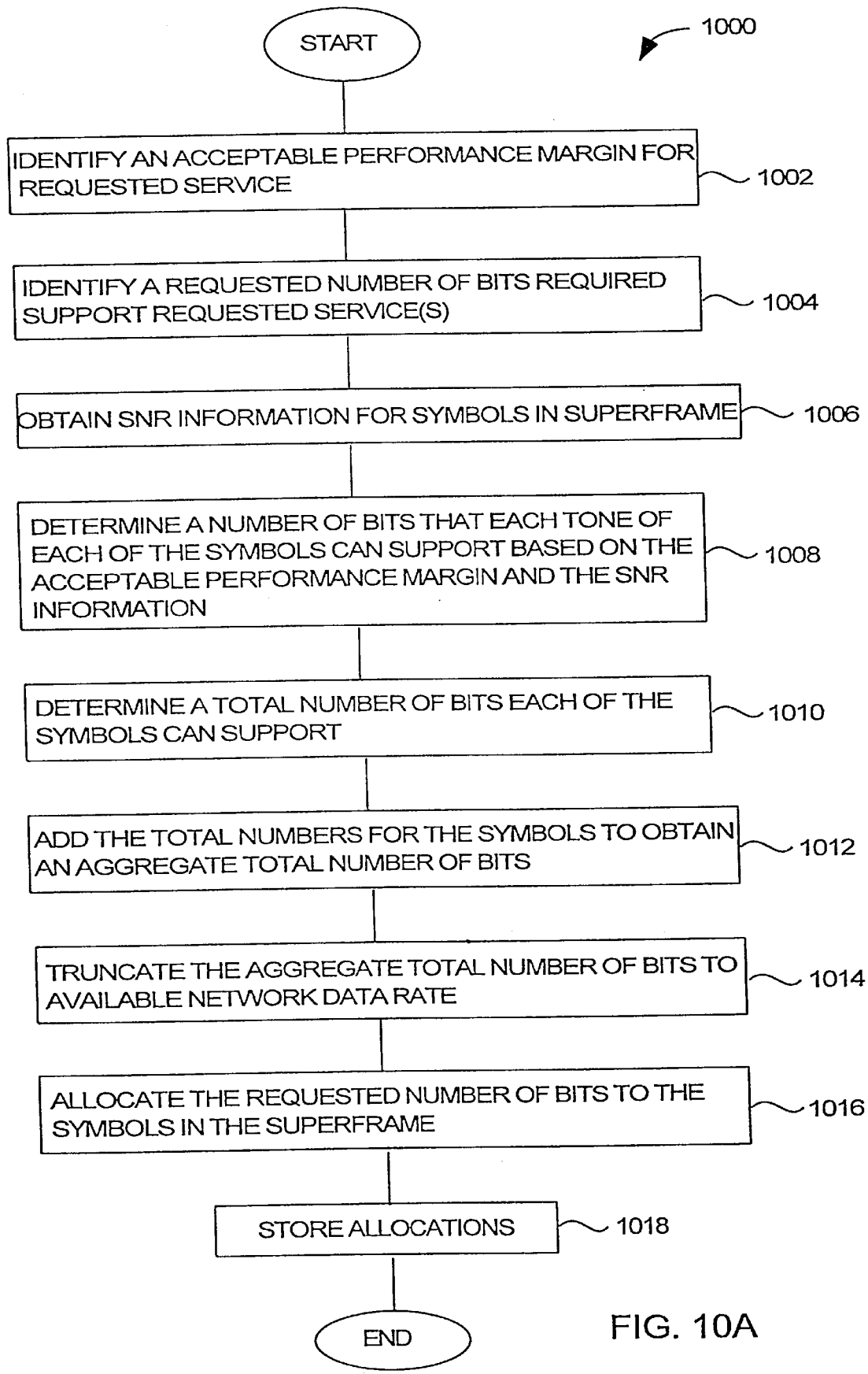
FIG. 10A illustrates a flow diagram of a superframe bit allocation process according to another embodiment of the invention.

In general, the superframe bit allocation process 900 allocates the bits of data to be transmitted over a superframe. By allocating over a superframe, the superframe bit allocation process 900 is able to take differing amounts of interference present on lines (e.g., NEXT interference) within a superframe into consideration. In other words, the interference on lines from frame to frame will vary within the superframe, and the allocation process 900 takes such variations into account in allocating bits. Consequently, those of the subchannels of a given superframe being subjected to large amounts of NEXT interference will receive less bits to transmit, and other subchannels being subjected to small amounts of NEXT interference will receive more bits to transmit. The transmission and reception of data is therefore better optimized by the invention. FIG. 10A illustrates a flow diagram of a superframe bit allocation process 1000 according to another embodiment of the invention. In this embodiment, a request for service is given in connection with achieving a maximum acceptable data rate.

The superframe bit allocation processing 1000 initially identifies 1002 an acceptable performance margin for requested service. The performance margin for the data transmission is typically requested by a requester. An example of an acceptable performance margins is: bit error rate of $10^{-7}$ with a 6 dB noise margin. Requested number of bits required to support requested service(s) are identified 1004. Typically, there is more than one acceptable requested service. For example, a network may be requesting service at 26 Mbit/s but if unavailable will accept service at 13 Mbit/s. Signal-to-noise ratio (SNR) information is also obtained 1006 for symbols in the superframe. The SNR information can be obtained by estimating channel response and measuring noise variance on a line.

Next, a number of bits that each tone of each of the symbols in the superframe is able to support is determined 1008 based on the acceptable performance margin and the SNR information. Then, a total number of bits that each of the symbols can support is determined 1010. The total number of bits that each symbol can support can be determined by adding the number of bits each tone within the symbol can support.

Then, the total numbers for the symbols obtained in block 1008 are added 1010 to obtain an aggregate total number of bits. To the extent necessary, the aggregate total number of bits is truncated 1014 to an available network data rate, namely to a data rate of one of the requested services. For example, if the aggregate total number of bits indicates a maximum data rate of 20 Mbit/s, then the number of bits to be allocated would be truncated to 13 Mbit/s where the requested services are 26 Mbit/s and 13 Mbit/s.

The determined number (i.e., the truncated number) of bits are then allocated 1016 to the symbols in the superframe. The allocation of the bits to the various frames and tones in the superframe can use various techniques, including those known techniques used to allocate bits in single frames. Eventually, the bits are allocated to the individual frequency tones of the symbols. Thereafter, the allocations for each symbol are stored 1018. As an example, the bit allocations for the superframe can be stored in the superframe bit allocation table. Following block 1016, the superframe bit allocation processing 1000 is complete and ends.

Figure 10B:
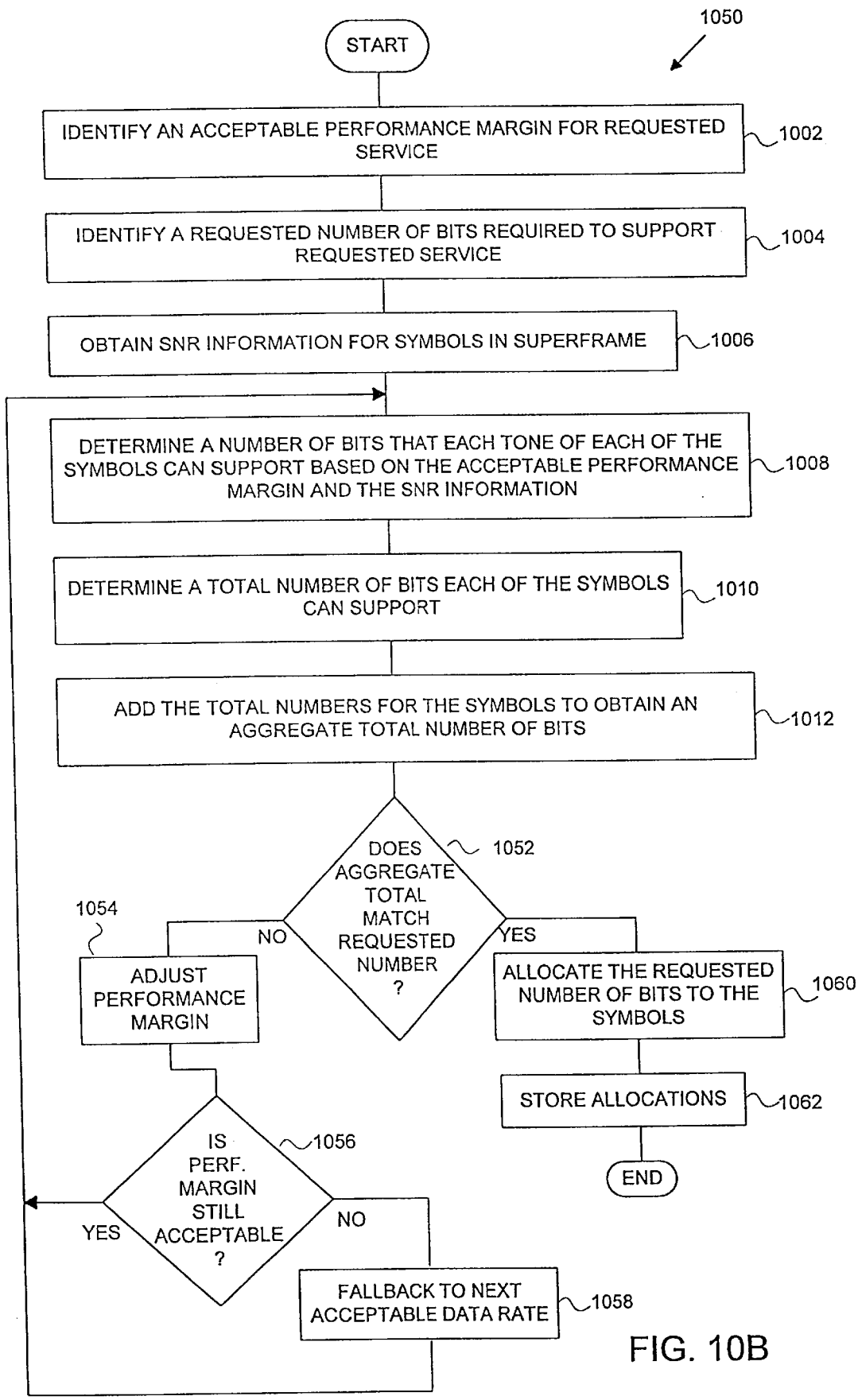
FIG. 10B illustrates a flow diagram of a superframe bit allocation process according to yet another embodiment of the invention.

FIG. 10B illustrates a flow diagram of a superframe bit allocation process 1050 according to yet another embodiment of the invention. In this embodiment, a request for service is given in connection with at least a certain performance margin.

The superframe bit allocation processing 1050 initially performs the same operations as blocks 1002–1012 of the bit allocation processing 1000 of FIG. 10A. Following block 1012, a decision block 1052 determines whether the aggregate total number of bits matches the requested number of bits.

When the aggregate total number of bits does not match the requested number of bits, the performance margin is adjusted 1054. The amount of adjustment can be made dependent on the separation of the aggregate total number of bits and the requested number of bits. Next, a decision block 1056 determines if the performance margin is still acceptable. Here, the performance margin existing after the adjustment 1054 is compared to the acceptable performance margin previously identified 1002. When the performance margin is determined not be acceptable after the adjustment 1054, then the requested service falls back 1058 to the next acceptable data rate. Following block 1058 as well as following the decision block 1056 when the performance margin is determined to be acceptable after the adjustment 1054, the bit allocation processing 1050 returns to repeat blocks 1008 and subsequent blocks in an iterative fashion.

When the aggregate total number of bits does (eventually) match the requested number of bits, the requested number of bits are allocated 1060 to the symbols. Again, the allocation of the bits to the various frames and tones in the superframe can use various techniques, including those known techniques used to allocate bits in single frames. Thereafter, the allocations for each symbol are stored 1062. As an example, the bit allocations for the superframe can be stored in the superframe bit allocation table. Following block 1062, the superframe bit allocation processing 1050 is complete and ends. The superframe bit allocation processing 1050 could also end if the decision block 1052 is unable to find a match after a predetermined number of iterations.

It should be noted that the allocation of bits to the symbols achieved by block 1062 can be stored in the superframe bit allocation table in many ways. With a full size superframe bit allocation table, each symbol can be effectively provided with its own bit allocation table that specifies the number of bits placed on each of the frequency tones. However, with a less than full size superframe bit allocation table, groups of symbols share effective bit allocation tables. The symbols can be grouped in a number of ways. One way to group the symbols is to consider those symbols having similar SNR information. Another way to group the symbols is to consider those symbols which are determined to be able to support a nearly equal number of bits.

Applying the superframe bit allocation processes 1000 or 1050 to the second superframe format 454 in the arrangement 450 illustrated in FIG. 4B, might operate to perform bit allocations as follows when symbols or frames are grouped. First, symbols A, B, C, H and J could be grouped together and labeled as group X symbols, symbols D and G could be grouped and labeled as group Y symbols, and E and F could be grouped and labeled group Z symbols. Then, starting with a performance margin of, say, 6 dB, bit allocations are separately or jointly determined for the symbol groups X, Y and Z, and the resulting total bits supported by symbols X, Y, Z are $B_X$, $B_Y$, and $B_Z$, respectively. The total number of bits that this system supports with the given performance margin is then equal to $5B_X+2B_Y+2B_Z=B_1$. Next, assume that B is the total number of bits required to support a given payload or service requested. The ratio of $B_1/B$ and the ratio of $5B_X$ vs. $2B_Y$ vs. $2B_Z$ are used to determine how the bits need to be allocated. This ratio is then able to be used to adjust the performance margin 1054 (FIG. 10A) or truncate 1014 and/or allocate 1016 the bits (FIG. 10B). Several iterations may be necessary to achieve accurate and near optimal results.

When a mixture of levels of service are provided by an ONU side, the levels of service being simultaneously provided will often change as new service starts on some lines and existing service stops on other lines. As a result, the particular superframes that are concurrently active is not constant. Also, the interference between these mixed levels of service provided by the different superframe formats is likewise not constant. Hence, it is advantageous to provide techniques for selecting an appropriate superframe format of a line requesting a level of service and then aligning the selected superframe format with the existing superframe formats already in service. Such techniques thus operate to improve the efficiency of data transmission by minimizing the impact of interference between the various lines in service.

Figure 11:
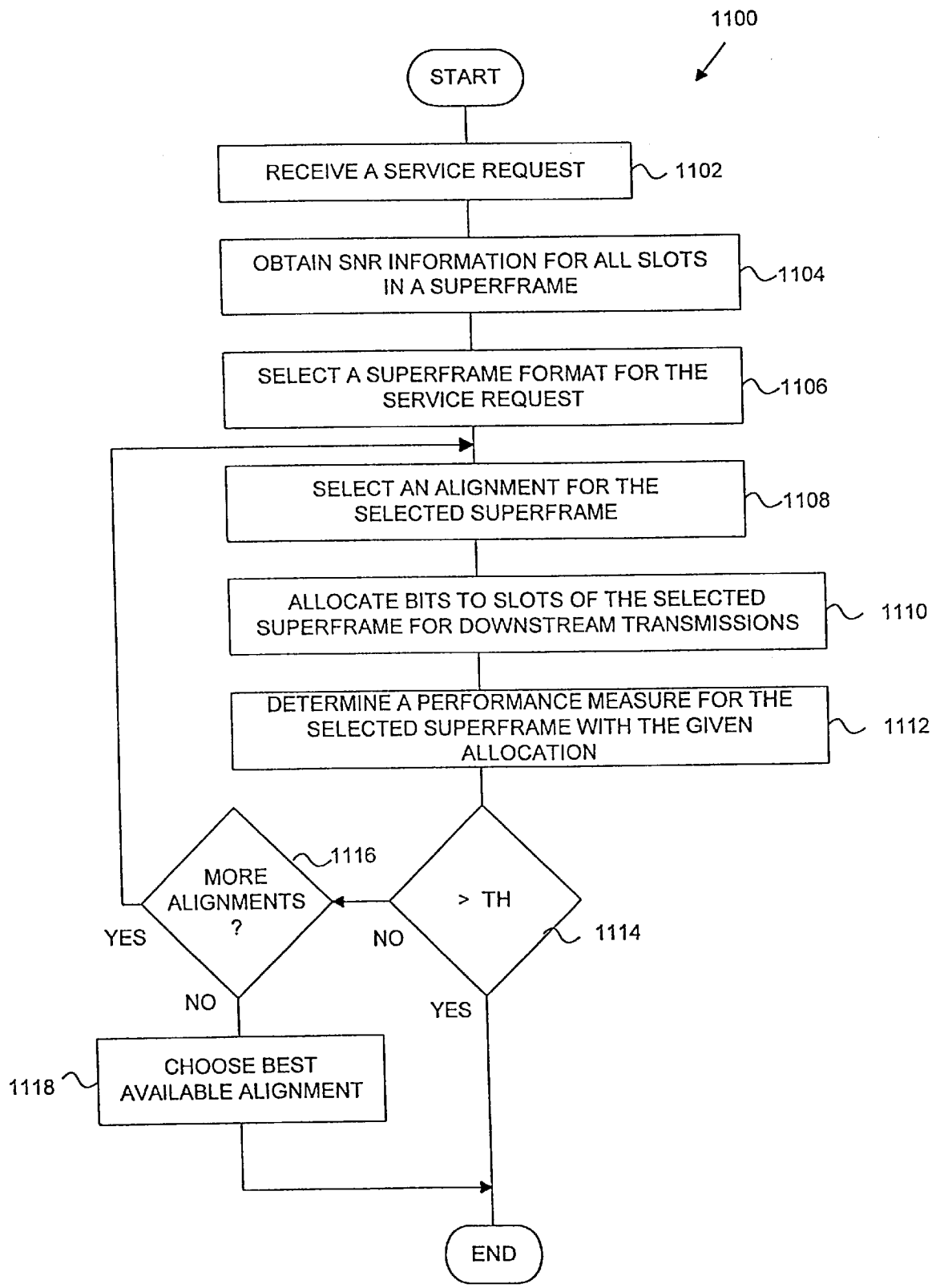
FIG. 11 is the flow diagram of superframe alignment processing according to an embodiment of the invention.

FIG. 11 is the flow diagram of superframe alignment processing 100 according to an embodiment of the invention. The superframe alignment processing 100 initially receives 1102 a service request. Then, SNR information is obtained 1104 for all slots in a superframe. Preferably, the slots refer to frequency tones within the superframe. Then, a superframe format is selected 1106 for the service request. Typically, the service request would indicate a transmission rate with some required quality of service for both downstream and upstream levels of service. As an example, the service request for a particular direction might be a bit error rate of less than $10^{-7}$ with 6 dB noise margin. An appropriate superframe format can be selected using the information from the service request. For example, if the downstream data rate requested is twice the upstream data rate requested, then the superframe format would likely require twice as many downstream frames as upstream frames. For this example, the superframe format "12-1-6-1" illustrated in FIG. 3 might be appropriate.

Next, an alignment for the selected superframe is selected 1108. At this point, the alignment is not necessarily the final alignment but is one alignment that is possible for the selected superframe. Then, bits are allocated 1110 to slots of the selected superframe for downstream transmissions with the selected alignment. In general, the bit allocation can be performed based on either a performance measure or a data rate. With the performance measure approach, a maximum total data rate is computed and then a suitable data rate for the requested service is determined. With the data rate approach, a performance margin for the superframe is determined and then compared with the performance margin of the requested service.

A performance measure for the selected superframe with the given allocation is then determined 1112. Next, a decision block 1114 determines whether the performance measure is greater than a predetermined threshold. If the performance measure does not exceed the predetermined threshold, then it is assumed that the alignment of the selected superframe is not the most desirable alignment. In this case, a decision block 1116 determines whether or not there are additional alignments of the selected superframe to be considered. If there are additional alignments to be considered, the superframe alignment processing 1110 returns to repeat blocks 1108 and subsequent blocks for a different alignment of the selected superframe.

On the other hand, when there are no more additional alignments to be considered, the best available alignment is chosen 1118 in accordance with their respective performance measures. In other words, of all the alignments considered for the selected superframe, the alignment providing the best performance measure is chosen. Following block 1118, the superframe alignment processing 1100 is completed. Also, when the decision block 1114 determines that the performance measure of a given alignment does exceed a predetermined threshold, then the superframe alignment processing 1100 may operate to end early without considering other alignments. The predetermined threshold could, for example, be a performance margin threshold or a data rate threshold. The decision block 1114 is optional and it may be preferred to endure the potentially extra processing time and consider all possible alignments before choosing an alignment for the superframe.

The superframe alignment processing 1100 could also consider fractional alignments in which the frame boundaries in one superframe are offset from frame boundaries of frames in another superframe. In this case, the block 1104 should be positioned between blocks 1108 and 1110 so that the SNR information can be reacquired for the fractional alignments.

Figure 12:
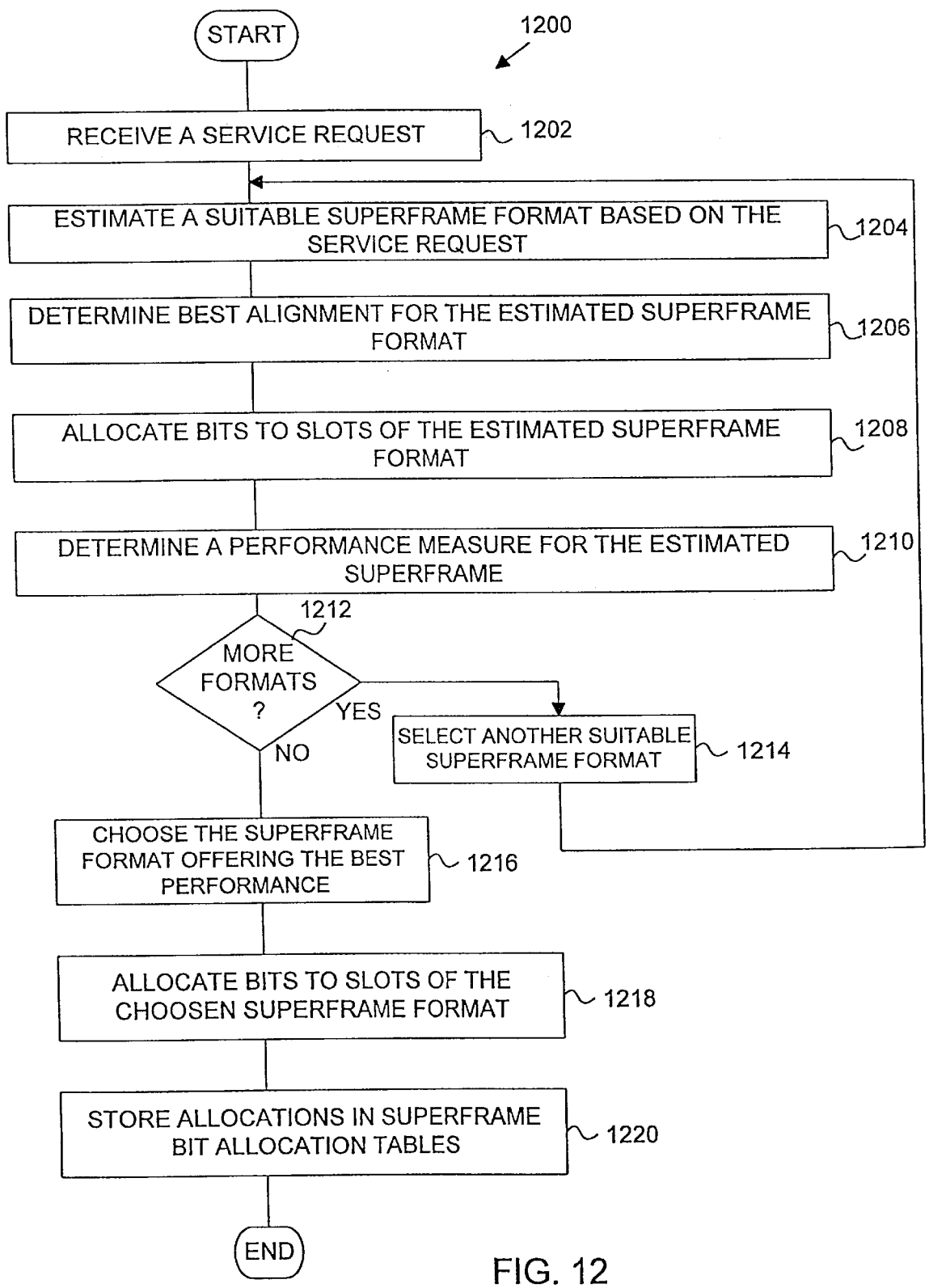
FIG. 12 is a flow diagram of optimized bit allocation processing.

FIG. 12 is a flow diagram of optimized bit allocation processing 1200. The optimized bit allocation processing 1200 initially receives 1202 a service request. A suitable superframe format is then estimated 1204 based on the service request. Next, a best alignment is determined 1206 for the estimated superframe format. As an example, the best alignment can be determined 1206 using the superframe alignment processing 1100 illustrated in FIG. 11. After the best alignment is determined 1206, bits are allocated 1208 to slots of the estimated superframe format. Then, a performance measure is determined 1210 for the estimated superframe. The performance measure for the estimated superframe provides a performance indication for the best alignment of the estimated superframe.

Next, a decision block 1212 determines whether there are additional superframe formats that would be suitable for consideration. If there are additional formats that are suitable for consideration, another suitable superframe format is selected 1214 and then processing returns to repeat block 1206 and subsequent blocks.

On the other hand, when the decision block 1212 determines that there are no more additional suitable superframe formats to be considered, the superframe format offering the best performance is then chosen 1216. In other words, using the performance measures for each of the estimated superframes, the particular superframe format offering the best performance is selected. Then, bits are allocated 1218 to slots of the chosen superframe format with its best alignment which was previously determined. Then, the allocations are stored 1220 in a superframe bit allocation table. If the storage capacity of the superframe bit allocation table is limited, then the optimized bit allocation processing 1200 may operate to group certain symbols having similar performance or interference characteristics, and then to allocate bits to the symbols and then to frequency tones of the symbols. Following block 1220 the optimized bit allocation processing 1200 is complete and ends.

A variety of allocation techniques can be adapted for allocation over a superframe according to the invention. As examples, the allocation techniques described in the following documents may be adapted by those skilled in the art: (1) U.S. Pat. No. 5,400,322; (2) Peter S. Chow et al., A Practical MultiTone Transceiver Loading Algorithm for Data Transmission over Spectrally Shaped Channels, IEEE Transactions on Communications, Vol. 23, No. 2/3/4, February, March/April 1995; and (3) Robert F.H. Fischer at al., A New Loading Algorithm for Discrete Multitone Transmission, IEEE 1996. Each of these three documents are hereby incorporated by reference.

Furthermore, the bit allocations once initially established can be updated using a number of techniques. One suitable technique uses bit swapping within a superframe. Bit swapping within a frame is described in U.S. Pat. No. 5,400,322. With a superframe structure the bit swapping now can be swapped for bits anywhere within the superframe. Such updating serves to keep the bit allocation for the superframe constant but flexible enough to compensate for noise variances that vary from superframe to superframe. The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A transmitter for a data transmission system using multicarrier modulation, said transmitter comprising:

a superframe bit allocation table, said superframe bit allocation tables stores superframe bit allocation information including separate bit allocation information for a plurality of frames of a superframe;

a data symbol encoder, said data symbol encoder receives digital data to be transmitted and encodes bits associated with the digital data to frequency tones of a frame based on the superframe bit allocation information associated with the frame stored in said superframe bit allocation table;

a multicarrier modulation unit, said multicarrier modulation unit modulates the encoded bits on the frequency tones of a frame to produce modulated signals; and a digital-to-analog converter, said digital-to-analog converter converts the modulated signals to analog signals, wherein the superframe includes a plurality of frames, with one or more of the frames being capable of carrying data in a first direction and zero or more of the frames being capable of carrying data in a second direction.

2. A transmitter as recited in claim 1, wherein said data symbol encoder encodes the bits of the digital data to those of the frames of the superframe that are assigned to carrying data in the first direction and not to those of the frames of the superframe that are assigned to carrying data in the second direction.

3. A transmitter as recited in claim 1, wherein said superframe bit allocation table includes a separate bit allocation table for each of the frames of the superframe that are assigned to carry data in the first direction.

4. A transmitter as recited in claim 1, wherein said modulation unit modulates the encoded bits on the frequency tones of a symbol using Discrete Multi Tone (DMT) modulation.

5. A transmitter as recited in claim 1, wherein said data symbol encoder is able to allocate bits differently in the various frames of a superframe by using different portions of the superframe bit allocation information stored in said superframe bit allocation table.

6. A transmitter as recited in claim 5, wherein said transmitter further comprises:
 a buffer, said buffer stores the digital data to be transmitted; and a controller operatively connected to said superframe bit allocation table, said controller operates to control retrieval of the different portions of the superframe bit allocation information stored in said superframe bit allocation table.

7. A transmitter as recited in claim 1, wherein said superframe bit allocation table includes a plurality of bit allocation tables, each of the bit allocation tables corresponds to a different one or more of the frames of the superframe.

8. An apparatus for recovering data transmitted by a transmitter, said apparatus comprising:
 an analog-to-digital converter, said analog-to-digital converter receives transmitted analog signals and produces digital signals therefrom, the transmitted analog signals being time domain signals representing data transmitted;
 a demodulator, said demodulator receives the digital signals and demodulates the digital signals to produce digital frequency domain data;
 a superframe bit allocation table, said superframe bit allocation table stores superframe bit allocation information including separate bit allocation information for a plurality of frames of a superframe; and
 a data symbol decoder, said data symbol decoder operates to decode bits associated with the digital frequency domain data from frequency tones of a frame based on the superframe bit allocation information associated with the frame stored in said superframe bit allocation tables,
 wherein the superframe includes a plurality of frames, with one or more of the frames being capable of carrying data in a first direction and zero or more of the frames being capable of carrying data in a second direction.

9. An apparatus as recited in claim 8, wherein said data symbol decoder operates to recover the bits of the digital data from those of the frames of the superframe that are assigned to carrying data in the first direction.

10. An apparatus as recited in claim 8, wherein said superframe bit allocation table includes a separate bit allocation table for each of the frames of the superframe that are assigned to carry data in the first direction.

11. An apparatus as recited in claim 8, wherein said demodulator operates to demodulate the digital signals using Discrete Multi Tone (DMT) demodulation.

12. An apparatus as recited in claim 8, wherein said data symbol decoder is able to recover a different number of bits from the various frames of a superframe by using different portions of the superframe bit allocation information stored in said superframe bit allocation table.

13. An apparatus as recited in claim 12, wherein said apparatus further comprises:
 a buffer, said buffer stores the decoded data; and
 a controller operatively connected to said superframe bit allocation table, said controller operates to control retrieval of the different portions of the superframe bit allocation information stored in said superframe bit allocation table.

14. A data transmission system using multicarrier modulation, said data transmission system comprising:
 a first transmitter that transmits data in accordance with a first superframe format, said first transmitter including at least:
  a first superframe bit allocation table, said first superframe bit allocation table is structured in accordance with the first superframe format and stores superframe bit allocation information including separate bit allocation information for a plurality of frames of a superframe;
  a first data symbol encoder, said first data symbol encoder receives first digital data to be transmitted and encodes bits associated with the first digital data to frequency tones of a frame based on the superframe bit allocation information associated with the frame stored in said first superframe bit allocation table and on the first superframe format;
  a first multicarrier modulation unit, said first multicarrier modulation unit modulates the encoded bits on the frequency tones of a frame to produce modulated signals; and
  a first digital-to-analog converter, said first digital-to-analog converter converts the modulated signals to analog signals; and
 a second transmitter that transmits data in accordance with a second superframe format, said second transmitter including at least:
  a second superframe bit allocation table, said second superframe bit allocation table is structured in accordance with the second superframe format and stores superframe bit allocation information including separate bit allocation information for a plurality of frames of a superframe;
  a second data symbol encoder, said second data symbol encoder receives second digital data to be transmitted and encodes bits associated with the second digital data to frequency tones of a frame based on the superframe bit allocation information associated with the frame stored in said second superframe bit allocation table and on the second superframe format;
  a second multicarrier modulation unit, said second multicarrier modulation unit modulates the encoded bits on the frequency tones of a frame to produce modulated signals; and
  a second digital-to-analog converter, said second digital-to-analog converter converts the modulated signals to analog signals.

15. A system as recited in claim 14, wherein the superframe includes a plurality of frames, with one or more of the frames being capable of carrying data in a transmit direction and zero or more of the frames being capable of carrying data in a receive direction.

16. A system as recited in claim 15,
 wherein said first data symbol encoder encodes the bits of the first digital data to those of the frames of the superframe that are assigned to carrying data in the transmit direction and not to those of the frames of the superframe that are assigned to carrying data in the receive direction, and wherein said second data symbol encoder encodes the bits of the second digital data to those of the frames of the superframe that are assigned to carrying data in the transmit direction and not to those of the frames of the superframe that are assigned to carrying data in the receive direction.

17. A system as recited in claim 14, wherein said first superframe bit allocation table includes a separate bit allocation table for each of the frames of the superframe that are assigned to carry data in the transmit direction, and wherein said second superframe bit allocation table includes a separate bit allocation table for each of the frames of the superframe that are assigned to carry data in the transmit direction.

18. A system as recited in claim 14, wherein said first and second modulation units modulate the encoded bits on the frequency tones of a frame using Discrete Multi Tone (DMT) modulation.

19. A system as recited in claim 14, wherein said first data symbol encoder is able to allocate bits differently in the various frames of a superframe by using different portions of the superframe bit allocation information stored in said first superframe bit allocation table, and wherein said second data symbol encoder is able to allocate bits differently in the various frames of a superframe by using different portions of the superframe bit allocation information stored in said second superframe bit allocationable.

20. A system as recited in claim 19, wherein said first transmitter further comprises:

a first buffer, said buffer stores the digital data to be transmitted; and a first controller operatively connected to said first superframe bit allocation table, said first controller operates to control retrieval of the different portions of the superframe bit allocation information stored in said first superframe bit allocation table.

21. A system as recited in claim 14, wherein each of said first and second superframe bit allocation tables include a plurality of bit allocation tables, and each of the bit allocation tables corresponds to a different one or more of the frames of the superframe.

22. A system as recited in claim 14, wherein the superframe includes a plurality of frames, with one or more of the frames being capable of carrying data in a transmit direction and one or more of the frames being capable of carrying data in a receive direction, and wherein the first superframe format is different than the second superframe format such that at least one frame within the first superframe format carries data in the transmit direction while concurrently at least one frame within the second superframe format receives data in the receive direction.

23. A data transmission system using multicarrier modulation, said data transmission system comprising:

a first transceiver that transmits and receives data in accordance with a first superframe format, said first transceiver including at least:

a first transmit superframe bit allocation table, said first transmit superframe bit allocation table is structured in accordance with a superframe having the first superframe format and stores first transmit superframe bit allocation information including separate bit allocation information for a plurality of transmit frames of the superframe, the transmit frames are capable of carrying data in a first direction;

a first transmitter for encoding data to be transmitted to frequency tones of the transmit frames of the superframe based on the first transmit superframe bit allocation information stored in said first transmit superframe bit allocation table, modulating the encoded data on the frequency tones of the transmit frames to produce modulated signals;

a first receive superframe bit allocation table, said first receive superframe bit allocation table is structured in accordance with the superframe having the first superframe format and stores first receive superframe bit allocation information including separate bit allocation information for a plurality of receive frames of the superframe, the receive frames are capable of carrying data in a second direction; and a first receiver for demodulating received data to produce demodulated signals, and decoding the demodulated signals from the frequency tones of the receive frames of the superframe based on the first receive superframe bit allocation information stored in said first receive superframe bit allocation table.

24. A data transmission system as recited in claim 23, wherein said data transmission system further comprises:

a second transceiver that transmits and receives data in accordance with a second superframe format, said second transceiver including at least:

a second transmit superframe bit allocation table, said second transmit superframe bit allocation table is structured in accordance with a superframe having the second superframe format and stores second transmit superframe bit allocation information including separate bit allocation information for a plurality of transmit frames of the superframe;

a second transmitter for encoding data to be transmitted to frequency tones of the transmit frames of the superframe based on the second transmit superframe bit allocation information stored in said second transmit superframe bit allocation table, modulating the encoded data on the frequency tones of the transmit frames to produce modulated signals;

a second receive superframe bit allocation table, said second receive superframe bit allocation table is structured in accordance with the superframe having the second superframe format and stores second receive superframe bit allocation information including separate bit allocation information for a plurality of receive frames of the superframe; and a second receiver for demodulating received data to produce demodulated signals, and decoding the demodulated signals from the frequency tones of the receive frames of the superframe based on the second receive superframe bit allocation information stored in said second receive superframe bit allocation table.

25. A system as recited in claim 24, wherein the first superframe format is different than the second superframe format such that at least one transmit frame within the first superframe format overlaps with at least one receive frame within the second superframe format.

* * * * *